United States Patent
Kamp et al.

(10) Patent No.: US 10,104,360 B2
(45) Date of Patent: Oct. 16, 2018

(54) IMAGE ENCODING METHOD, IMAGE DECODING METHOD, IMAGE ENCODING APPARATUS, AND IMAGE DECODING APPARATUS

(71) Applicant: Panasonic Corporation, Osaka (JP)

(72) Inventors: Steffen Kamp, Frankfurt (DE); Matthias Narroschke, Schaafheim (DE); Thomas Wedi, The Hague (NL); Semih Esenlik, Nazilli (TR)

(73) Assignee: SUN PATENT TRUST, New York, NY (US)

( * ) Notice: Subject to any disclaimer, the term of this patent is extended or adjusted under 35 U.S.C. 154(b) by 259 days.

(21) Appl. No.: 14/198,942

(22) Filed: Mar. 6, 2014

(65) Prior Publication Data

US 2014/0184742 A1 Jul. 3, 2014

Related U.S. Application Data

(63) Continuation of application No. PCT/JP2013/004192, filed on Jul. 5, 2013.
(Continued)

(51) Int. Cl.
*H04N 13/00* (2018.01)
*H04N 13/161* (2018.01)
(Continued)

(52) U.S. Cl.
CPC .......... *H04N 13/161* (2018.05); *H04N 13/00* (2013.01); *H04N 13/111* (2018.05);
(Continued)

(58) Field of Classification Search
CPC .. H04N 13/0048; H04N 19/597; H04N 19/70; H04N 13/0066; H04N 13/0011; H04N 13/0022
(Continued)

(56) References Cited

U.S. PATENT DOCUMENTS 8,089,507 B2 1/2012 Ikeda et al.
8,238,439 B2 8/2012 Pandit et al.
(Continued)

FOREIGN PATENT DOCUMENTS

CN 1578428 2/2005
CN 101291434 10/2008
(Continued)

OTHER PUBLICATIONS

International Search Report dated Aug. 13, 2013 in corresponding International Application No. PCT/JP2013/004192.
(Continued)

*Primary Examiner* — Thai Q Tran
*Assistant Examiner* — Nien Yang
(74) *Attorney, Agent, or Firm* — Wenderoth, Lind & Ponack, L.L.P.

(57) ABSTRACT

An image encoding method for encoding a multi-view image captured from a plurality of capturing views includes: generating a plurality of view identification information items each for identifying a plurality of display views that are a plurality of views used for display in an image decoding apparatus, by corresponding to each of a plurality of screen sizes used in the image decoding apparatus; and encoding the view identification information items.

7 Claims, 28 Drawing Sheets

Related U.S. Application Data

(60) Provisional application No. 61/673,422, filed on Jul. 19, 2012.

(51) Int. Cl.
| | | |
|---|---|---|
| *H04N 19/597* | (2014.01) | |
| *H04N 19/70* | (2014.01) | |
| *H04N 13/111* | (2018.01) | |
| *H04N 13/128* | (2018.01) | |
| *H04N 13/178* | (2018.01) | |

(52) U.S. Cl.
CPC ......... *H04N 13/128* (2018.05); *H04N 13/178* (2018.05); *H04N 19/597* (2014.11); *H04N 19/70* (2014.11)

(58) Field of Classification Search
USPC .......................................................... 348/43
See application file for complete search history.

(56) References Cited

U.S. PATENT DOCUMENTS

| | | | |
|---|---|---|---|
| 8,498,331 | B2 | 7/2013 | Kato et al. |
| 8,699,583 | B2 | 4/2014 | Hannuksela et al. |
| 9,219,911 | B2 | 12/2015 | Ushiki et al. |
| 2005/0025234 | A1 | 2/2005 | Kato et al. |
| 2005/0146521 | A1* | 7/2005 | Kaye ............... G06T 3/00 345/419 |
| 2008/0013620 | A1 | 1/2008 | Hannuksela et al. |
| 2008/0095228 | A1 | 4/2008 | Hannuksela et al. |
| 2009/0160932 | A1* | 6/2009 | Kim ............... H04N 19/597 348/42 |
| 2010/0020884 | A1 | 1/2010 | Pandit et al. |
| 2010/0026884 | A1* | 2/2010 | Jeon ............... H04N 19/597 348/385.1 |
| 2010/0034293 | A1 | 2/2010 | Lin et al. |
| 2010/0208042 | A1* | 8/2010 | Ikeda ............. G11B 20/1251 348/53 |
| 2011/0063512 | A1 | 3/2011 | Leichsenring et al. |
| 2011/0122131 | A1 | 5/2011 | Bruls et al. |
| 2011/0254925 | A1 | 10/2011 | Ushiki et al. |
| 2011/0273542 | A1* | 11/2011 | Suh ............... H04N 13/0048 348/51 |
| 2012/0062711 | A1 | 3/2012 | Ikeda et al. |
| 2012/0275765 | A1 | 11/2012 | Ikeda et al. |
| 2013/0155204 | A1 | 6/2013 | Kokubun et al. |

FOREIGN PATENT DOCUMENTS

| | | |
|---|---|---|
| CN | 101536527 | 9/2009 |
| CN | 101548548 | 9/2009 |
| CN | 101578872 | 11/2009 |
| CN | 102067181 | 5/2011 |
| CN | 102106152 | 6/2011 |
| CN | 102223550 | 10/2011 |
| JP | 4564107 | 10/2010 |
| JP | 2012-89906 | 5/2012 |
| WO | 2012/026185 | 3/2012 |

OTHER PUBLICATIONS

A. Norkin, et al., "Show-case and syntax for SEI message on reference display information signaling", Joint Collaborative Team on 3D Video Coding Extension Development of ITU-T SG 16 WP 3 and ISO/IEC JTC 1/SC 29/WG 11, 1$^{st}$ Meeting: Stockholm, SE, Jul. 16-20, 2012, Document: JCT2-A0163_r1.

Recommendation ITU-T H.264, "Advanced video coding for generic audiovisual services", ITU-T H.264 Telecommunication Standardization Sector of ITU(Jun. 2011).

Benjamin Bross et al., "High efficiency video coding (HEVC) text specification draft 7", JCTVC-I1003 Joint Collaborative Team on Video Coding (JCT-VC) of ITU-T SG16 WP3 and ISO/IEC JTC1/SC29/WG11 9th Meeting: Geneva, CH, Apr. 27-May 7, 2012.

Teruhiko Suzuki et al., "Text of ISO/IEC 14496-10:2012/DAM 2 MVC extensions for inclusion of depth maps", ISO/IEC JTC1/SC29/WG11, MPEG2012/Nxxxxx, Stockholm, SE, Jul. 2012.

Extended European Search Report dated Jun. 30, 2015 in corresponding European Application No. 13807884.5.

A. Norkin et al., "View synthesis adaptation to display parameters", MPEG Meeting, Apr. 30, 2012-May 4, 2012, Geneva, ISO/IEC JTC1/SC29/WG11, No. m24975, Jun. 7, 2012, XP030053318.

Office Action dated Jan. 29, 2016 in corresponding Chinese Patent Application No. 201380002054.5 (with partial English Translation).

* cited by examiner

FIG. 4

| | C | Descriptor |
|---|---|---|
| 3d_reference_displays_info( payloadSize ) { | | |
|   prec_ref_baseline | 5 | ue(v) |
|   prec_ref_display_width | 5 | ue(v) |
|   ref_viewing_distance_flag | 5 | u(1) |
|   if( ref_viewing_distance_flag ) | | |
|     prec_ref_viewing_dist | 5 | ue(v) |
|   num_ref_displays_minus1 | 5 | ue(v) |
|   numRefDisplays = num_ref_displays_minus1 + 1 | | |
|   for( i = 0; i < numRefDisplays; i++ ) { | | |
|     exponent_ref_baseline[i] | 5 | u(6) |
|     mantissa_ref_baseline[i] | 5 | u(v) |
|     exponent_ref_display_width[i] | 5 | u(6) |
|     mantissa_ref_display_width[i] | 5 | u(v) |
|     if(ref_viewing_distance_flag) { | | |
|       exponent_ref_viewing_distance[i] | 5 | u(6) |
|       mantissa_ref_viewing_distance[i] | 5 | u(v) |
|     } | | |
|     additional_shift_present_flag[i] | 5 | u(1) |
|     if (additional_shift_present[i]) | | |
|       num_pixel_shift_plus128[i] | 5 | u(8) |
|   } | | |
| } | | |

FIG. 11

| 3d_reference_displays_info( payloadSize ) { | C | Descriptor |
|---|---|---|
|   prec_ref_baseline | 5 | ue(v) |
|   prec_ref_display_width | 5 | ue(v) |
|   ref_viewing_distance_flag | 5 | ue(v) |
|   if(ref_viewing_distance_flag) | | |
|     prec_ref_viewing_dist | 5 | ue(v) |
|   num_ref_displays_minus1 | 5 | ue(v) |
|   numRefDisplays = num_ref_displays_minus1 + 1 | | |
|   for( i = 0; i < numRefDisplays ; i++ ) { | | |
|     preferred_left_view_id_flag | 5 | u(1) |
|     if( preferred_left_view_id )flag | | |
|       preferred_left_view_id | 5 | ue(v) |
|     preferred_right_view_id_flag | 5 | u(1) |
|     if( preferred_right_view_id) flag | | |
|       preferred_right_view_id | 5 | ue(v) |
|     if( !preferred_left_view_flag \|\| !preferred_right_view_flag ) { | | |
|       exponent_ref_baseline [i] | 5 | u(6) |
|       mantissa_ref_baseline [i] | 5 | u(v) |
|     } | | |
|     exponent_ref_display_width[i] | 5 | u(6) |
|     mantissa_ref_display_width [i] | 5 | u(v) |
|     if(ref_viewing_distance_flag) { | | |
|       exponent_ref_viewing_distance [i] | 5 | u(6) |
|       mantissa_ref_viewing_distance [i] | 5 | u(v) |
|     } | | |
|     additional_shift_present_flag [i] | 5 | u(1) |
|     if (additional_shift_present[ i ]) | | |
|       num_pixel_shift_plus128 [i] | 5 | u(8) |
|   } | | |
| } | | |

Stream of TS packets

Data structure of PMT

FIG. 29
| Corresponding standard | Driving frequency |
|---|---|
| MPEG-4 AVC | 500 MHz |
| MPEG-2 | 350 MHz |
| ⋮ | ⋮ |
FIG. 30A
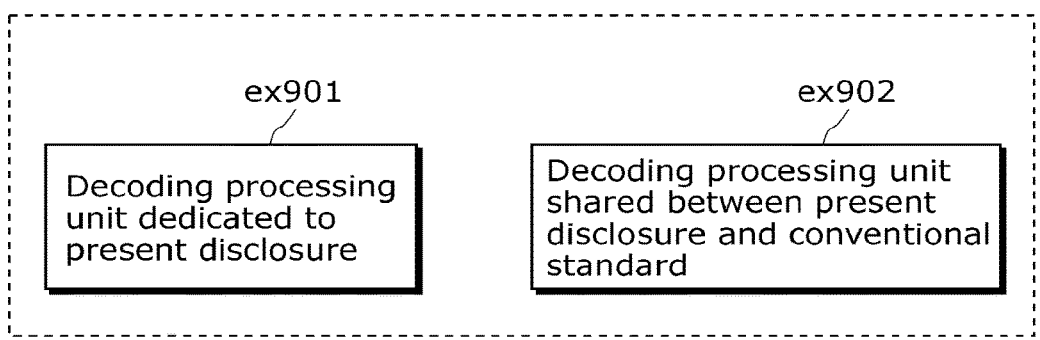
FIG. 30B
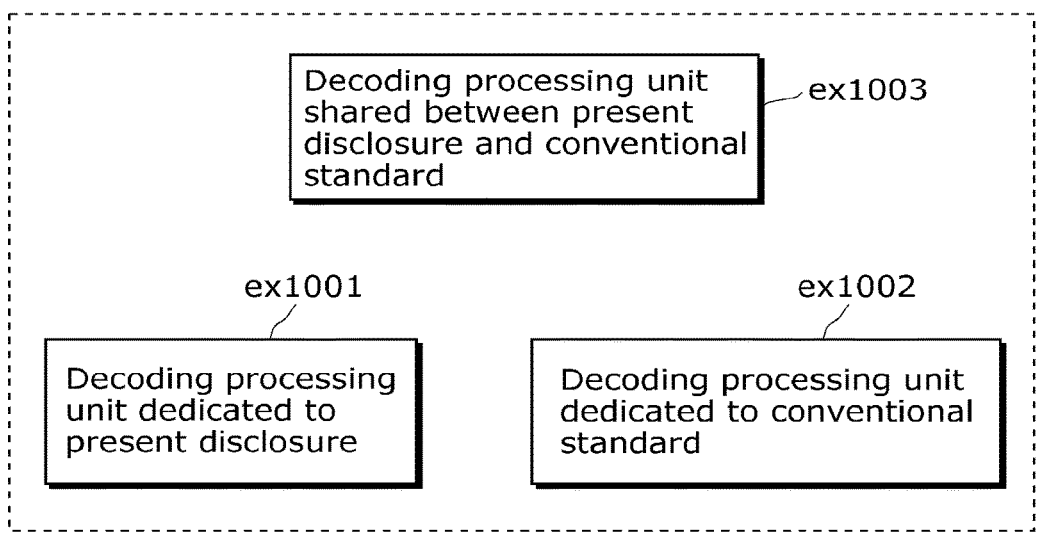

IMAGE ENCODING METHOD, IMAGE DECODING METHOD, IMAGE ENCODING APPARATUS, AND IMAGE DECODING APPARATUS

CROSS REFERENCE TO RELATED APPLICATION

This is a continuation application of PCT Patent Application No. PCT/JP2013/004192 filed on Jul. 5, 2013, designating the United States of America, which is based on and claims priority of U.S. Provisional Patent Application No. 61/673,422 filed on Jul. 19, 2012. The entire disclosures of the above-identified applications, including the specifications, drawings and claims are incorporated herein by reference in their entirety.

FIELD

One or more exemplary embodiments disclosed herein relate generally to an image encoding method and an image decoding method.

BACKGROUND

In a 3D (stereoscopic video) application, typically, encoded data is generated when an image encoding apparatus conforming to a video coding standard H.264/Multi View Coding (MVC) captures and encodes a multi-view image including two or more images. It should be noted that there is also a case where the multi-view image includes depth information. Then, the encoded data is transmitted to an image decoding apparatus. The image decoding apparatus decodes the encoded data and displays a multi-view image obtained by decoding.

Here, for example, the image encoding apparatus captures a multi-view image using two cameras that are disposed at a predetermined distance from each other (for example, refer to Non Patent Literature 1).

CITATION LIST

Non Patent Literature

Non Patent Literature 1: A. Norkin, I. Girdzijauskas, Y. Zhao, Y. Luo, "Show-case and syntax for SEI message on reference display information signaling", JCT3V-A0163 (MPEG number m26275)

SUMMARY

Technical Problem

However, it is desirable that the image encoding method and the image decoding method make it possible to provide views with an optimal depth impression without depending on an image decoding apparatus.

Therefore, one non-limiting and exemplary embodiment provides an image encoding method or an image decoding method which makes it possible to provide viewers with an optical depth impression without depending on the image decoding apparatus.

Solution to Problem

In one general aspect, the techniques disclosed here feature an image encoding method for encoding a multi-view image captured from a plurality of capturing views which includes: generating a plurality of view identification information items each for identifying a plurality of display views that are a plurality of views used for display in an image decoding apparatus, by corresponding to each of a plurality of screen sizes used in the image decoding apparatus; and encoding the view identification information items.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An image encoding method or an image decoding method according to one or more exemplary embodiments or features disclosed herein provide viewers with an optical depth impression without depending on the image decoding apparatus.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a diagram showing an example of a syntax configuration of SEI according to the reference example.

FIG. 11 is a diagram showing an example of a syntax configuration of SEI according to Embodiment 1.

FIG. 29 shows an example of a look-up table in which video data standards are associated with driving frequencies.

FIG. 30A is a diagram showing an example of a configuration for sharing a module of a signal processing unit.

FIG. 30B is a diagram showing another example of a configuration for sharing a module of the signal processing unit.

DESCRIPTION OF EMBODIMENTS (Underlying Knowledge Forming Basis of the Present Disclosure)

In relation to the image encoding apparatus which encodes an image and the image decoding apparatus which decodes an image disclosed in the Background section, the inventors have found the following problem.

As described in Non Patent Literature 1, when the distance between the cameras is constant, the depth impression felt by a viewer depends on the size of the display.

Conversely, in Non Patent Literature 1, supplemental enhancement information (SEI) "depth_acquisition_info" related to a real distance between the cameras in the capturing is transmitted to an image decoding apparatus for allowing the image decoding apparatus (display device) to adjust the depth impression. Furthermore, by SEI "3d_reference_displays_info", for example, for each of the viewing conditions, the optimal inter-camera distance for realizing the optimal depth impression in the viewing condition is transmitted. Here, the viewing condition is specifically the screen size of the display.

With this, the image decoding apparatus can adjust the depth impression by displaying an image corresponding to the optimal distance based on a relationship between the real inter-camera distance and the optimal inter-camera distance.

Moreover, there is a case where an image for each of the views to be displayed is generated by synthesizing the images of two views.

Figure 1:
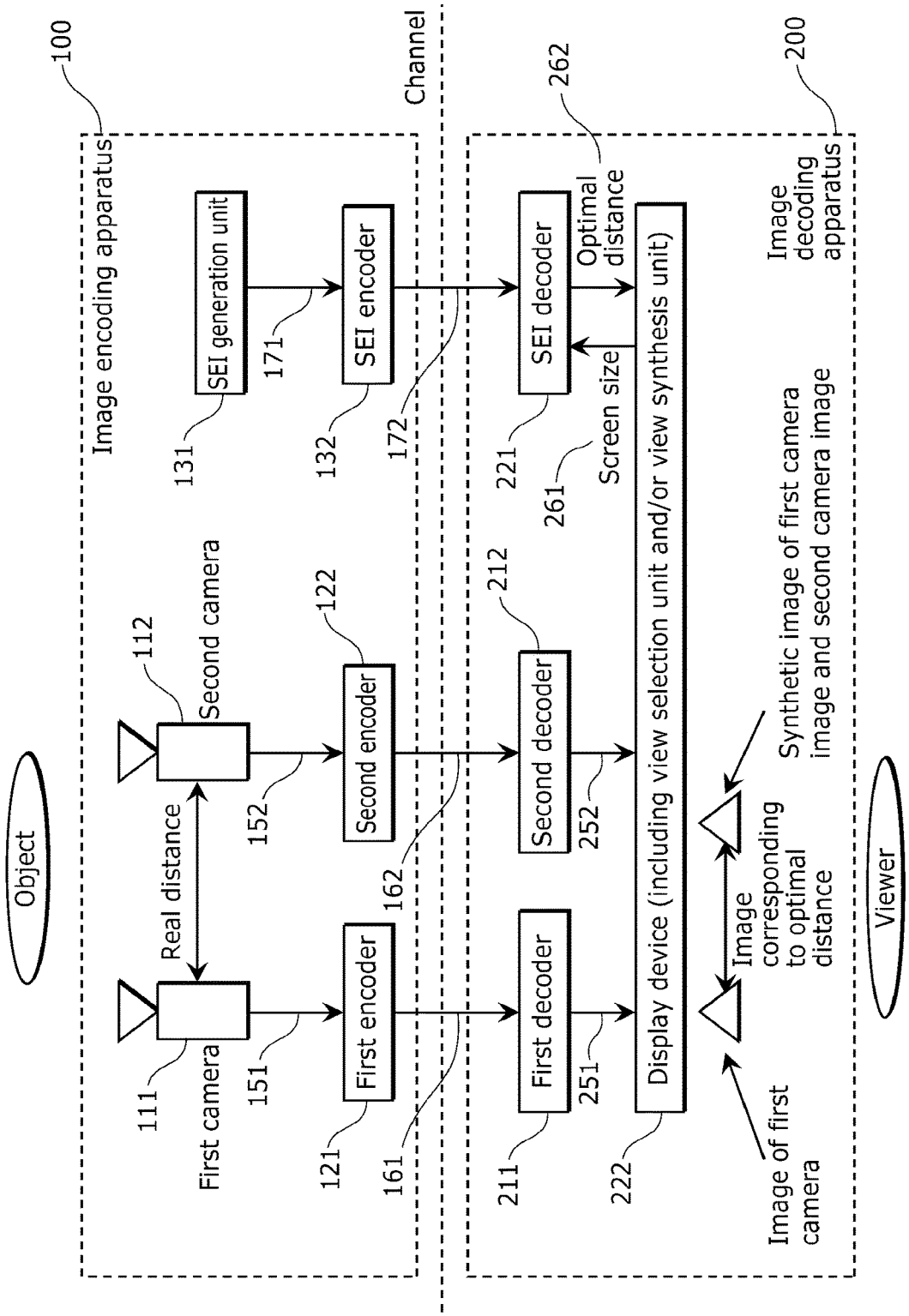
FIG. 1 is a block diagram of an image encoding apparatus and an image decoding apparatus according to a reference example.
Figure 2:
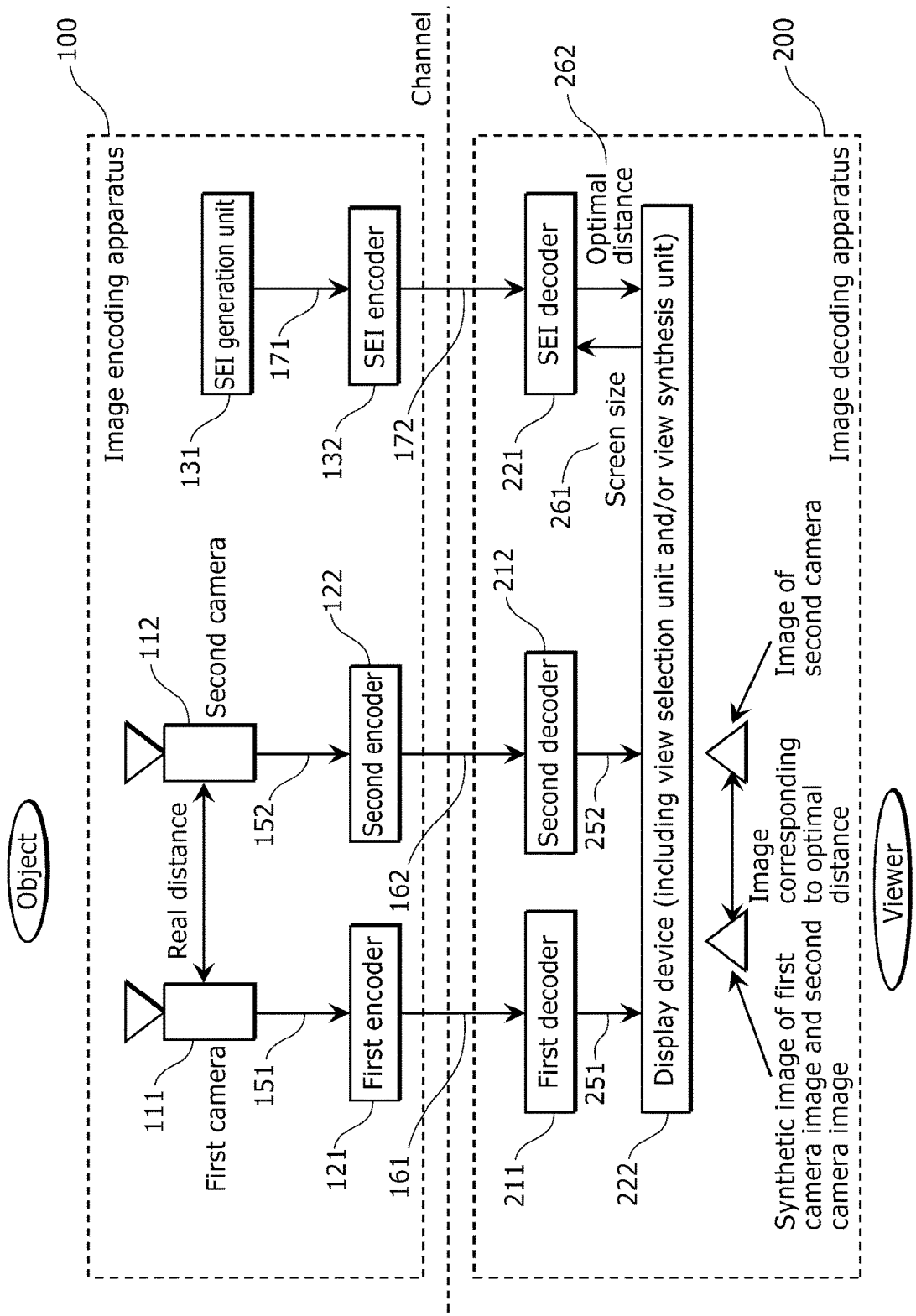
FIG. 2 is a block diagram of the image encoding apparatus and the image decoding apparatus according to the reference example.
Figure 3:
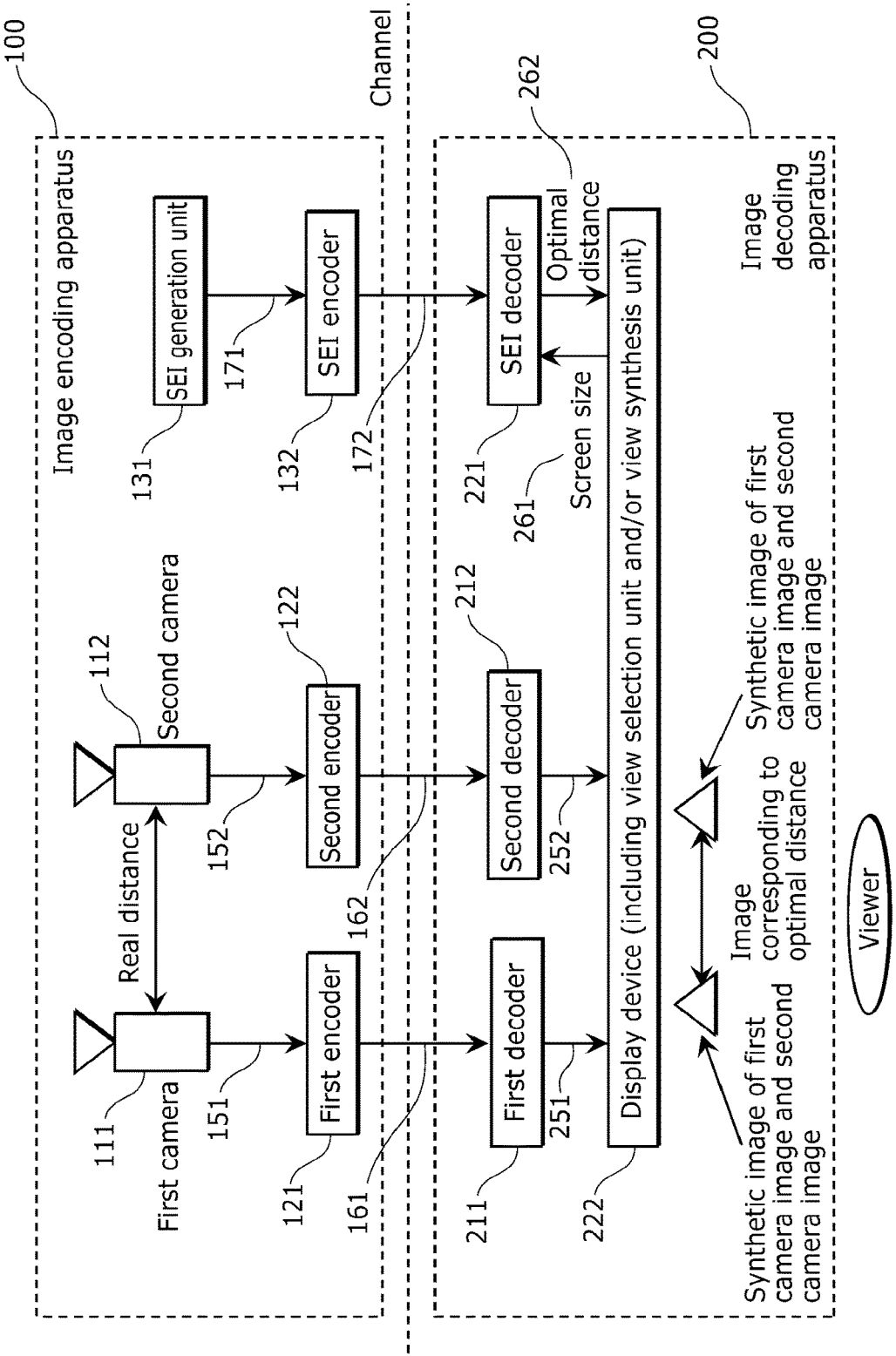
FIG. 3 is a block diagram of the image encoding apparatus and the image decoding apparatus according to the reference example.

FIGS. 1 to 3 each show a diagram showing a configuration of an image encoding apparatus 100 and an image decoding apparatus 200 according to a reference example of the present embodiment.

The image encoding apparatus 100 captures an object (scene) from a plurality of views, and generates an encoded bitstream by encoding the multi-view image obtained by the capturing. The image encoding apparatus 100 includes a first camera 111, a second camera 112, a first encoder 121, a second encoder 122, an SEI generation unit 131, and an SEI encoder 132.

The first camera 111 and the second camera 112 capture a multi-view image. Specifically, the first camera 111 generates a first image 151 by capturing the object (scene) from a first view. The second camera 112 generates a second image 152 by capturing the object from a second view.

The first encoder 121 generates a first encoded image 161 by encoding the first image 151. The second encoder 122 generates a second encoded image 162 by encoding the second image 152.

The SEI generation unit 131 generates an optimal distance 171 corresponding to each of the screen sizes. In other words, the SEI generation unit 131 generates a plurality of the optimal distances 171 corresponding to the screen sizes on a one-to-one basis. The optimal distance 171 is a distance between the cameras (views) which can provide a viewer with the optimal impression when displaying a multi-view image on the display of the corresponding screen size.

The SEI encoder 132 generates an encoded optimal distance 172 by encoding the optimal distances 171.

As described above, the image encoding apparatus 100 generates an encoded bitstream which includes the first encoded image 161, the second encoded image 162, and the encoded optimal distance 172. The encoded bitstream is transmitted via a channel to the image decoding apparatus 200.

The image decoding apparatus 200 decodes the encoded bitstream generated by the image encoding apparatus 100, and displays a multi-view image. The image decoding apparatus 200 includes a first decoder 211, a second decoder 212, an SEI decoder 221, and a display device 222.

The first decoder 211 generates a first decoded image 251 by decoding the first encoded image 161. The second decoder 212 generates a second decoded image 252 by decoding the second encoded image 162.

The SEI decoder 221 generates a plurality of optimal distances 262 by decoding the encoded optimal distance 172.

The display device 222 (display) displays a multi-view image (stereoscopic image) using the first decoded image 251 and the second decoded image 252. Specifically, the display device 222 obtains the optimal distance 262 corresponding to its own screen size 261, among the optical distances 262. Then, the display device 222 displays a multi-view image according to the obtained optimal distance 262.

For example, as shown in FIG. 1, the display device 222 generates a synthetic image corresponding to a view between the first view and the second view by synthesizing views using the first decoded image 251 and the second decoded image 252. Then, the display device 222 displays the generated synthetic image and the image of the first camera 111 (first decoded image 251) as a multi-view image. Here, a distance between views of the synthetic image and the image of the first camera 111 is equal to the optimal distance 262.

It should be noted that as shown in FIG. 2, the display device 222 may display the synthetic image and the image of the second camera 112 (second decoded image 252). Moreover, as shown in FIG. 3, the display device 222 may display two synthetic images.

Moreover, FIG. 4 is a diagram showing a syntax of SEI "3d_reference_displays_info". As shown in FIG. 4, exponent_ref_baseline [i] and mantissa_ref_baseline [i] correspond to the optimal distance 171 (262). It should be noted that the meaning for each of the parameters is described in Non Patent Literature 1, for example.

As described above, the image decoding apparatus 200 decodes, from the encoded bitstream, information about the real distance between the cameras used for encoding the images with a plurality of views. Moreover, the image decoding apparatus 200 decodes information indicating one or more viewing conditions from the encoded bitstream. Here, the viewing condition is, for example, the screen size of the display device 222 included in the image decoding apparatus 200. The image decoding apparatus 200 further decodes, from the encoded bitstream, a plurality of the optical distances 262 each of which is information indicating the optical inter-camera distance for each of the viewing conditions. Here, the optimal inter-camera distance is an inter-camera distance which should have been used for capturing the image for each of the views to provide a viewer with the optimal depth impression.

The image decoding apparatus 200 selects views to be used for display achieving the desired depth impression, using the real viewing condition, the decoded optimal inter-camera distance, and the real inter-camera distance. The image decoding apparatus 200 may further generate an image for display by view synthesis for allowing two different view distances used for display to be an optimal inter-camera distance.

As described above, the image encoding apparatus 100 transmits parameters for calculating the optimal inter-camera distance to the image decoding apparatus 200 for allowing the image decoding apparatus 200 to calculate a view position for view synthesis.

Moreover, the image decoding apparatus 200 understands a relationship between the real inter-camera distance and the optimal inter-camera distance from SEI, and selects a view to be used for display. In other words, the image decoding apparatus 200 determines two different view positions for allowing a distance between two views to be the optimal inter-camera distance.

However, the image decoding apparatus 200 can arbitrarily set two views when the distance between the two views is the optimal inter-camera distance. For example, the image decoding apparatus 200 can arbitrarily select two views to be used for display as shown in FIGS. 1 to 3. In other words, since which view to be selected depends on the image decoding apparatus 200, the same content is not displayed for all the viewers.

As described above, the inventors found a problem that in the above described technique, the content displayed according to the image decoding apparatus is different.

According to an exemplary embodiment disclosed herein, an image encoding method is an image encoding method for encoding a multi-view image captured from a plurality of capturing views which includes: generating a plurality of view identification information items each for identifying a plurality of display views that are a plurality of views used for display in an image decoding apparatus, by corresponding to each of a plurality of screen sizes used in the image decoding apparatus; and encoding the view identification information items.

With this, in the image encoding method, view identification information for identifying a view to be selected by the image decoding apparatus according to the screen size of the image decoding apparatus is transmitted to the image decoding apparatus. With this, the image decoding apparatus displays an image using a view identified by the view identification information corresponding to its own screen size. With this, a view to be used for display uniquely in the image decoding apparatus is determined. Therefore, the image encoding method makes it possible to provide a viewer with the optical depth impression without depending on the image decoding apparatus.

For example, each of the view identification information items may indicate one of the capturing views.

For example, each of the view identification information items may indicate a view of a synthetic image which is generated by synthesizing images captured from two of the capturing views.

For example, each of the view identification information items may be an identifier for identifying the capturing views.

Moreover, according to an exemplary embodiment disclosed herein, an image decoding method is an image decoding method for decoding a bitstream generated by encoding a multi-view image captured from a plurality of capturing views, and the image decoding method includes: decoding a plurality of view identification information items each for identifying a plurality of views which correspond to each of a plurality of screen sizes, each of the view identification information items being included in the bitstream; and determining a plurality of display views that are a plurality of views used for display in an image decoding apparatus, using one view identification information item corresponding to one of the screen sizes of a display device included in the image decoding apparatus, among the decoded view identification information items.

With this, in the image decoding method, an image is displayed using a view identified by the view identification information corresponding to the screen size of the image decoding apparatus. With this, a view to be used for display uniquely in the image decoding apparatus is determined. Therefore, the image decoding method makes it possible to provide a viewer with the optical depth impression without depending on the image decoding apparatus.

For example, each of the view identification information items may indicate one of the capturing views, and in the determining, the one capturing view indicated by the view identification information item among the capturing views may be determined as one of the display views.

For example, each of the view identification information items indicates a view of a synthetic image which is generated by synthesizing images captured from two of the capturing views.

For example, each of the view identification information items may be an identifier for identifying the capturing views.

According to an exemplary embodiment disclosed herein, an image encoding apparatus is an image encoding apparatus which encodes a multi-view image captured from a plurality of capturing views, the image encoding apparatus including: a view identification information generation unit configured to generate a plurality of view identification information items each for identifying a plurality of display views that are a plurality of views used for display in an image decoding apparatus, by corresponding to each of a plurality of screen sizes used in the image decoding apparatus; and a view identification information encoder which encodes the view identification information items.

With this, the image encoding apparatus transmits, to the image decoding apparatus, view identification information for identifying a view to be selected by the image decoding apparatus according to the screen size of the image decoding apparatus. With this, the image decoding apparatus displays an image using a view identified by the view identification information corresponding to its own screen size. With this, a view to be used for display uniquely in the image decoding apparatus is determined. Therefore, the image encoding apparatus can provide a viewer with the optical depth impression without depending on the image decoding apparatus.

Moreover, according to an exemplary embodiment disclosed herein, an image decoding apparatus is an image decoding apparatus which decodes a bitstream generated by encoding a multi-view image captured from a plurality of capturing views, the image decoding apparatus including: a view identification information decoder which decodes a plurality of view identification information items each for identifying a plurality of views which correspond to each of the screen sizes, each of the view identification information items being included in the bitstream; and a view determination unit configured to determine a plurality of display views that are a plurality of views used for display in an image decoding apparatus, using one view identification information item corresponding to each of the screen sizes of a display device included in the image decoding apparatus, among the decoded view identification information items.

With this, the image decoding apparatus displays an image using a view identified by the view identification information corresponding to its own screen size. With this, a view to be used for display uniquely in the image decoding apparatus is determined. Therefore, the image decoding apparatus can provide a viewer with the optical depth impression without depending on its own functions.

Moreover, according to an exemplary embodiment disclosed herein, an image coding apparatus may include the image encoding apparatus and the image decoding apparatus.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

The present embodiment will describe an efficient method that can define a view to be used for display in the image decoding apparatus in order to guarantee that the displayed content is the same for all the viewers.

Specifically, the image encoding apparatus according to the present embodiment selects a view position corresponding to the optimal inter-camera distance for one or more viewing conditions (specifically, the screen size), and encodes information about the view position in the bitstream.

Moreover, the image decoding apparatus decodes information indicating one or more viewing conditions from a bitstream. The image decoding apparatus decodes, from the bitstream, information about a view position on each of the decoded viewing conditions. The view position corresponds to the optimal inter-camera distance which should have been used for capturing the image for each of the views to provide a viewer with the optimal depth impression. In other words, the image decoding apparatus does not have to decode, from a bitstream, information indicating the real inter-camera distance. The image decoding apparatus selects a plurality of views that can achieve the desired depth impression, using the real viewing condition and the decoded view position.

Figure 5:
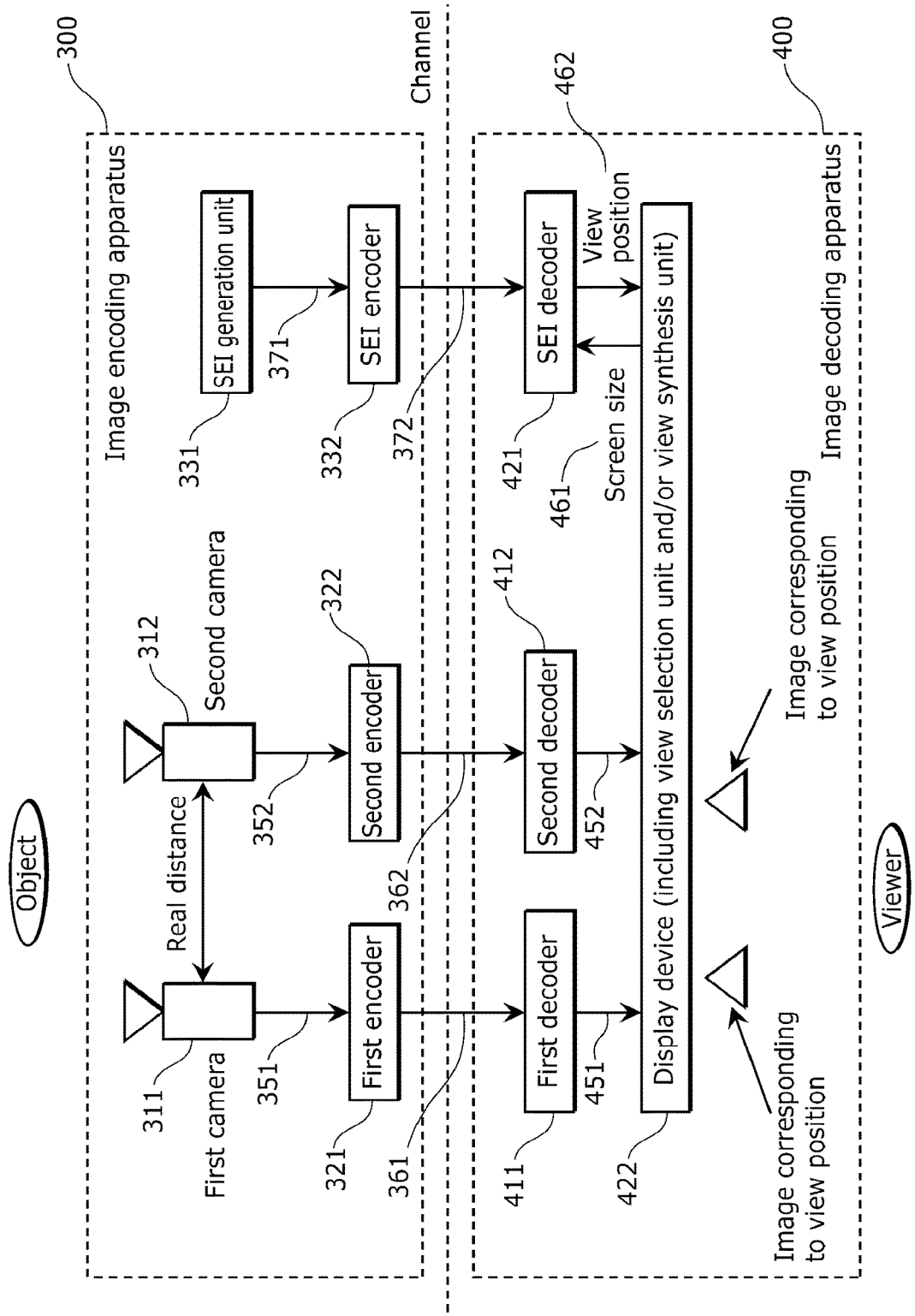
FIG. 5 is a block diagram of an image encoding apparatus and an image decoding apparatus according to Embodiment 1.

FIG. 5 is a diagram showing a configuration of an image encoding apparatus 300 and an image decoding apparatus 400 according to a reference example of the present embodiment.

The image encoding apparatus 300 captures an object (scene) from a plurality of views (capturing views), and generates an encoded bitstream by encoding the multi-view image (stereoscopic video) obtained by the capturing. The image encoding apparatus 300 includes a first camera 311, a second camera 312, a first encoder 321, a second encoder 322, an SEI generation unit 331, and an SEI encoder 332.

The first camera 311 and the second camera 312 capture a multi-view image. Specifically, the first camera 311 generates a first image 351 by capturing the object (scene) from a first view. The second camera 312 generates a second image 352 by capturing the object from a second view. The first image 351 and the second image 352 are included in the multi-view image.

The first encoder 321 generates a first encoded image 361 by encoding the first image 351. The second encoder 322 generates a second encoded image 362 by encoding the second image 352.

The SEI generation unit 331 is a view identification information generation unit which generates a view position 371 corresponding to each of the screen sizes. In other words, the SEI generation unit 331 generates a plurality of the view positions 371 corresponding to the screen sizes on a one-to-one basis. Each of the view positions 371 is the positions of the two views (display views) which can provide a viewer with the optimal depth impression when displaying a multi-view image (stereoscopic image) on the display of the corresponding screen size.

An SEI encoder 332 is a view identification information encoder which generates an encoded view position 372 by encoding the view positions 371.

As described above, the image encoding apparatus 300 generates an encoded bitstream which includes the first encoded image 361, the second encoded image 362, and the encoded view position 372. The encoded bitstream is transmitted via a channel to the image decoding apparatus 400.

The image decoding apparatus 400 decodes the encoded bitstream generated by the image encoding apparatus 300, and displays a multi-view image. The image decoding apparatus 400 includes a first decoder 411, a second decoder 412, an SEI decoder 421, and a display device 422.

The first decoder 411 generates a first decoded image 451 by decoding the first encoded image 361. The second decoder 412 generates a second decoded image 452 by decoding the second encoded image 362.

The SEI decoder 421 is a view identification information decoder which generates a plurality of the view positions 462 by decoding the encoded view position 372.

The display device 422 (display) displays a multi-view image (stereoscopic image) using the first decoded image 451 and the second decoded image 452. Specifically, the display device 422 obtains a view position 462 corresponding to its own screen size 461, among the view positions 462. Then, the display device 422 determines, according to the obtained view position 462, display views that are a plurality of views to be used for display, and displays the images from the determined display views as a multi-view image. The determination of the display view is performed by a view determination unit included in the display device 422.

For example, as shown in FIG. 5, the display device 422 generates a synthetic image corresponding to a view between the first view and the second view by synthesizing views using the first decoded image 451 and the second decoded image 452. Here, the view positions of the two synthetic images generated by view synthesis correspond to the two view positions 462. For example, the view positions of the two synthetic images are identical to the two view positions 462.

Then, the display device 422 displays the generated two synthetic images as a multi-view image. It should be noted that at least one of the two view positions 462 may be equal to a view position of the first camera or the second camera. In this case, view synthesis is not performed, and the first decoded image 451 or the second decoded image 452 is used for display.

Figure 6:
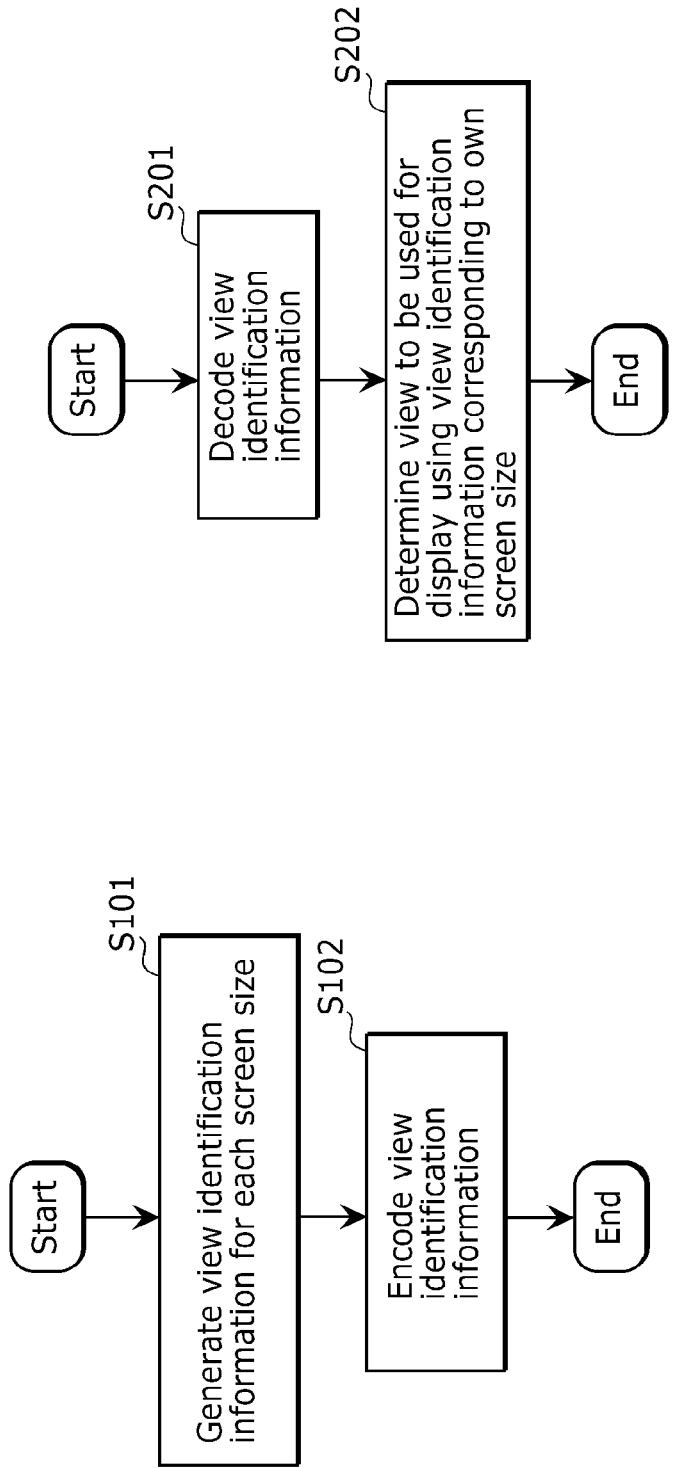
FIG. 6A is a flowchart of image encoding processing according to Embodiment 1.
FIG. 6B is a flowchart of image decoding processing according to Embodiment 1.

FIG. 6A is a flowchart showing an outline of image encoding processing performed by the image encoding apparatus 300.

As shown in FIG. 6A, the image encoding apparatus 300 generates view identification information for identifying a plurality of display vies to be used for display in the image decoding apparatus, by corresponding to each of the screen sizes used in the image decoding apparatus (S101). Here, the view identification information corresponds to the above described view position 371.

Next, the image encoding apparatus 300 encodes the view identification information (S102). Then, the bitstream including the encoded view identification information is transmitted to the image decoding apparatus 400.

FIG. 6B is a flowchart showing an outline of image decoding processing performed by the image decoding apparatus 400.

As shown in FIG. 6B, the image decoding apparatus 400 decodes view identification information that identifies views which corresponds to each of the screen sizes and that is included in a bitstream (S201).

Next, the image decoding apparatus 400 determines display views that are views to be used for display in the image decoding apparatus 400, using view identification information corresponding to the screen size 461 of the display device 422 included in the image decoding apparatus 400 among the decoded view identification information items (S202). Moreover, the image decoding apparatus 400 displays a multi-view image using the determined display views. Specifically, the image decoding apparatus 400 generates images seen from the display views and displays the generated images, using the first decoded image 451 of the first view and the second decoded image 452 of the second view.

As described above, in the present embodiment, the view identification information of view (two views for stereo display) is directly included in a bitstream. In this case, the image decoding apparatus 400 does not have to know the optima inter-camera distance. In other words, the optimal inter-camera distance can be omitted.

Furthermore, the image decoding apparatus 400 does not have to automatically select a view to be used for display. Therefore, when the viewing conditions are the same in the different image decoding apparatuses, the same view is selected as a view to be used for display. Therefore, even when the image decoding apparatus is different, the same depth impression can be guaranteed.

In other words, in the present embodiment, information directly indicating the view position instead of a distance between views (relative position between views) is transmitted from the image encoding apparatus 300 to the image decoding apparatus 400.

Moreover, the image encoding apparatus 300 can control which view to be used for display in the image decoding apparatus 400. Therefore, a content producer can, for example, influence the content to be displayed according to individual request such as the optimal image quality or a favorable content. This is because the views are video from slightly different views in the original scene. Therefore, the content to be displayed is different depending on the selection of an encoded view.

As described above, in the present embodiment, the only definition of a view displayed in the image decoding apparatus makes it possible not only to guarantee that the content to be displayed is the same for all the viewers but also to select a view in the image encoding apparatus for allowing a subjective image quality to be maximum.

It should be noted that although the above description describes an example of the case where a stereo image is used as a multi-view image, the mufti-view image may include images of three or more views. Moreover, the number of views in a multi-view image generated in the image encoding apparatus 300 may be different from the number of views in a multi-view image to be displayed in the image decoding apparatus 400.

The following will describe a specific example of the view identification information (the view position 462, and the like).

Figure 7:
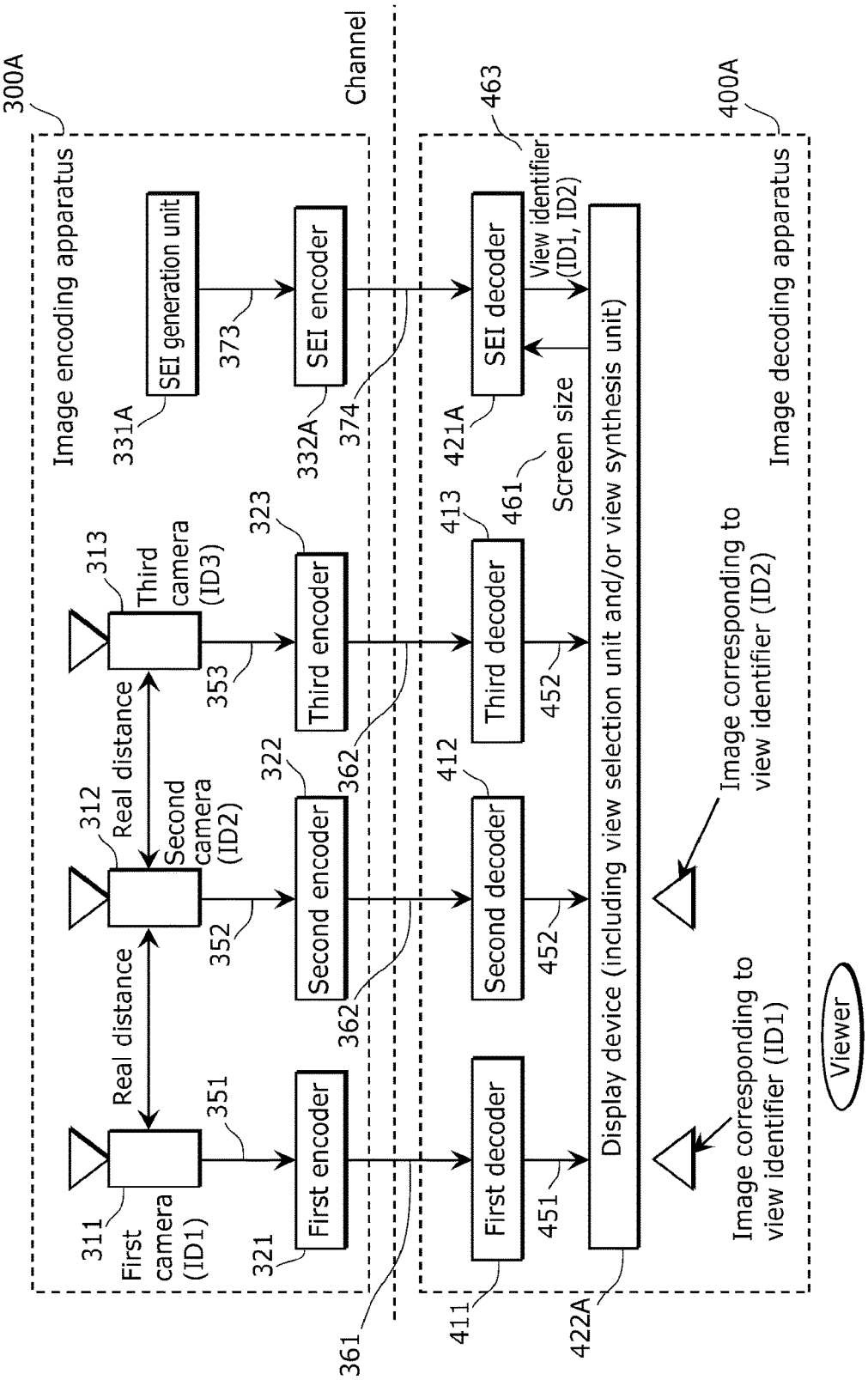
FIG. 7 is a block diagram of the image encoding apparatus and the image decoding apparatus according to Embodiment 1.

FIG. 7 is a block diagram showing a configuration of an image encoding apparatus 300A and an image decoding apparatus 400A when a view identifier is used as the view identification information. It should be noted that the elements which are the same as those in FIG. 5 are provided with the same reference signs, and the different points will be mainly described later.

The image encoding apparatus 300A shown in FIG. 7 includes a third camera 313 and a third encoder 323 in addition to the configuration of the image encoding apparatus 300. Moreover, the functions of an SEI generation unit 331A and an SEI encoder 332A are different from those of the SEI generation unit 331 and the SEI encoder 332.

The third camera 313 generates a third image 353 by capturing the object (scene) from a third view. In other words, the first camera 311, the second camera 312, and the third camera 313 generate a multi-view image including the first image 351, the second image 352, and the third image 353. Moreover, identifiers (ID1, ID2, and ID3) for uniquely identifying the cameras are assigned to the first camera 311, the second camera 312, and the third camera 313, respectively.

The third encoder 323 generates a third encoded image 363 by encoding the third image 353.

The SEI generation unit 331A is a view identification information generation unit which generates a view identifier 373 corresponding to each of the screen sizes. In other words, the SEI generation unit 331A generates a plurality of the view identifiers 373 corresponding to the screen sizes. Each of the view identifiers 373 is an identifier for identifying a plurality of capturing views, and indicates an identifier (ID1, ID2, and ID3) assigned to the camera, for example. In other words, the view identifier 373 is an identifier which identifies the first image 351, the second image 352, and the third image 353, and an identifier which identifies the first decoded image 451, the second decoded image 452, and the third decoded image 453 to be described later.

Moreover, the view identifier 373 shows capturing views which correspond to the two views (display views) which can provide a viewer with the optimal depth impression when displaying a multi-view image (stereoscopic image) on the display of the corresponding screen size. Specifically, the identifier is a view ID or a view order index.

The SEI encoder 332A is a view identification information encoder which generates an encoded view position 374 by encoding the view identifiers 373.

As described above, the image encoding apparatus 300A generates an encoded bitstream which includes the first encoded image 361, the second encoded image 362, the third encoded image 363, and the encoded view identifier 374. Then, the encoded bitstream is transmitted via a channel to the image decoding apparatus 400A.

The image decoding apparatus 400A decodes the encoded bitstream generated by the image encoding apparatus 300A, and displays a multi-view image. The image decoding apparatus 400A includes a third decoder 413 in addition to the configuration of the image decoding apparatus 400. Moreover, the functions of an SEI decoder 421A and a display device 422A are different from the functions of the SEI decoder 421 and the display device 422.

The third decoder 413 generates a third decoded image 453 by decoding the third encoded image 363.

The SEI decoder 421A is a view identification information decoder which generates a plurality of the view identifiers 463 by decoding the encoded view identifier 374.

The display device 422A (display) displays a multi-view image (stereoscopic image) using the first decoded image 451, the second decoded image 452, and the third decoded image 453. Specifically, the display device 422A obtains a view identifier 463 corresponding to its own screen size 461, among the view identifiers 463. Then, the display device 422A determines, according to the obtained view identifier 463, display views that are a plurality of views to be used for display, and displays the images from the determined display views as a multi-view image. The determination of the display view is performed by a view determination unit included in the display device 422A.

Figure 8:
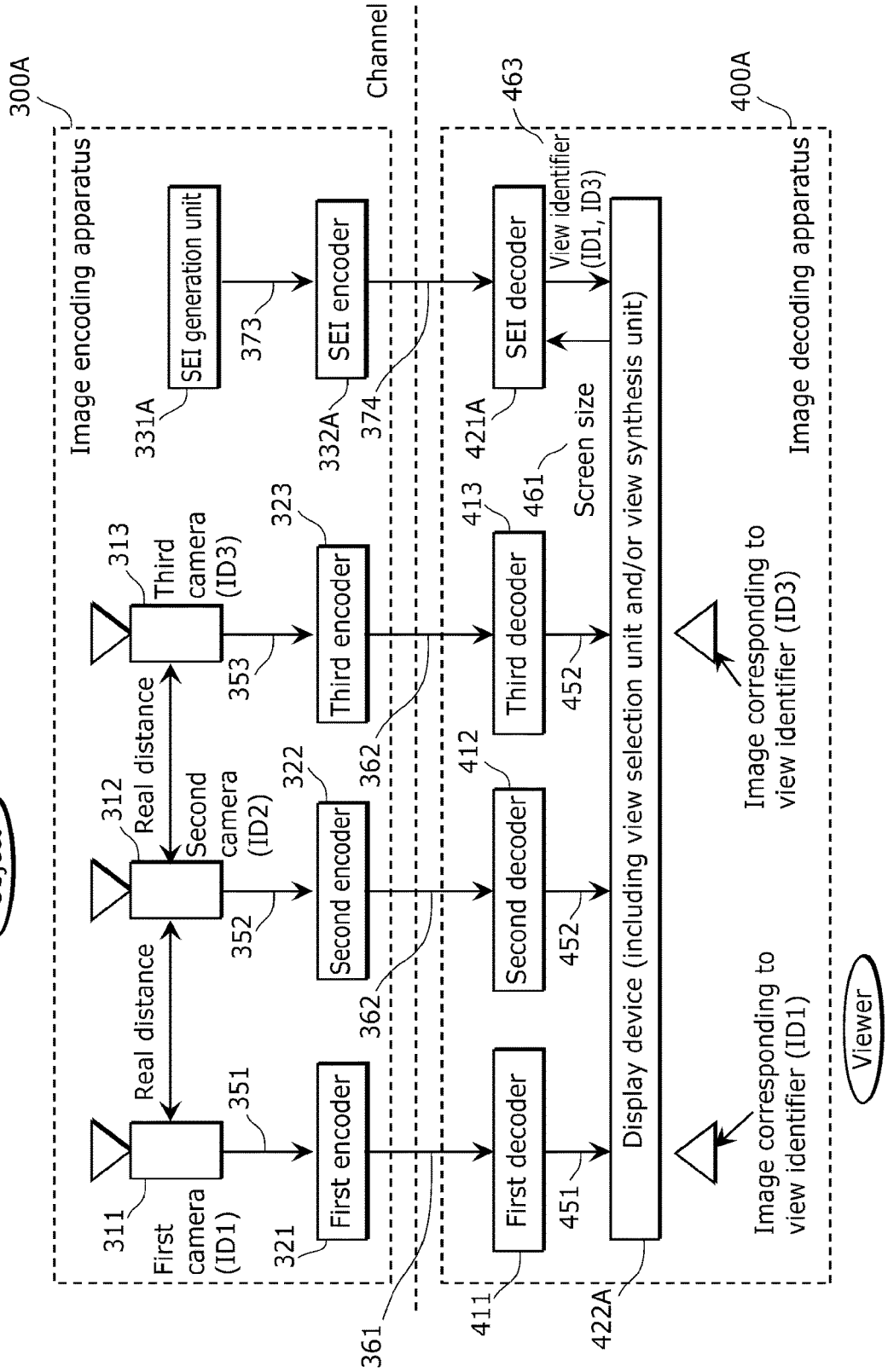
FIG. 8 is a block diagram of the image encoding apparatus and the image decoding apparatus according to Embodiment 1.
Figure 9:
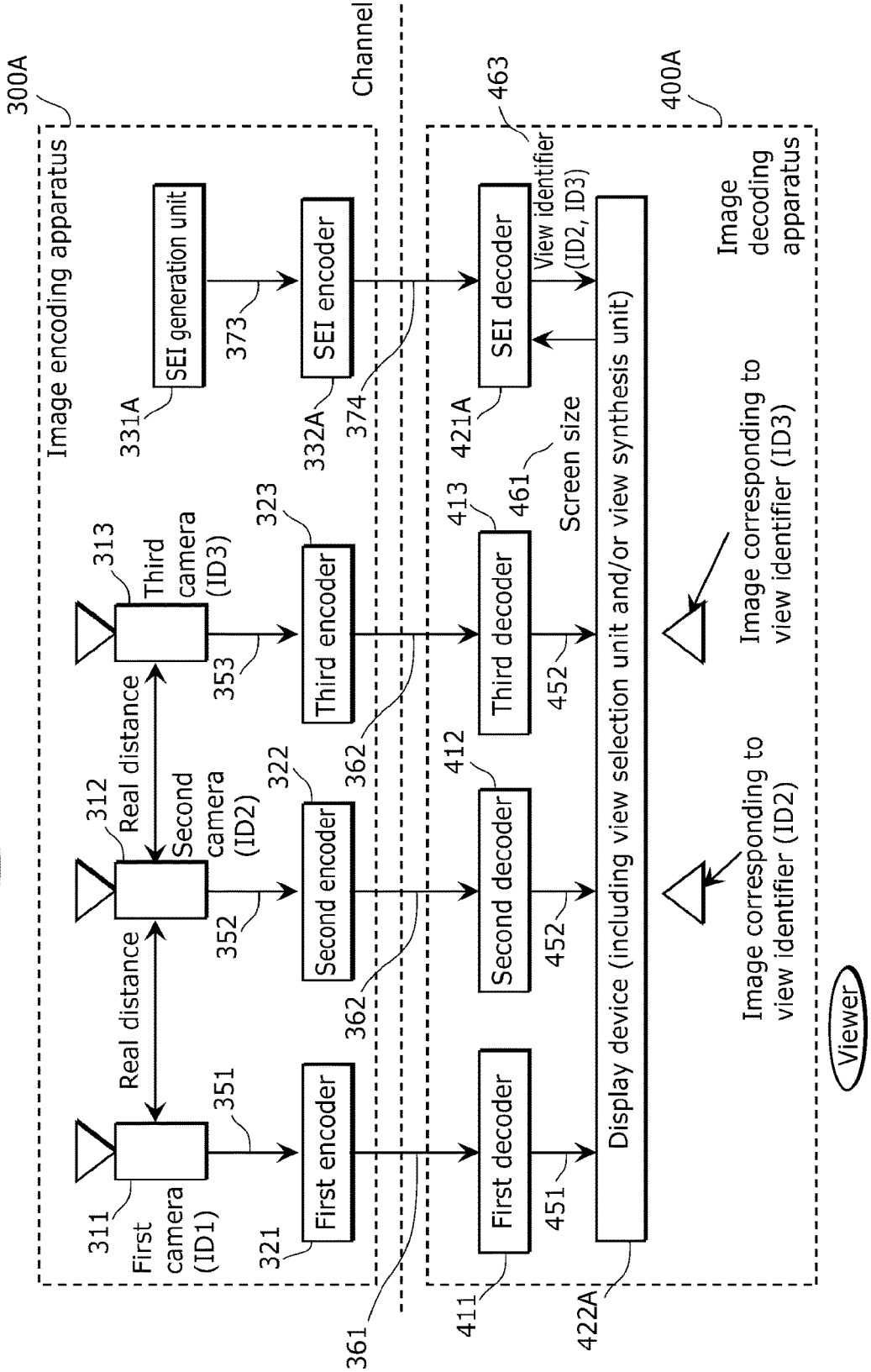
FIG. 9 is a block diagram of the image encoding apparatus and the image decoding apparatus according to Embodiment 1.

Specifically, the display device 422A determines that one capturing view indicated by the view identification information among the capturing views is one of the display views. In other words, the display device 422A displays decoded images corresponding to the view identifier 463 among the decoded images (the first decoded image 451, the second decoded image 452, and the third decoded image 453). For example, as shown in FIG. 7, when ID1 and ID2 are indicated by the view identifier 463, the display device 422A displays the first decoded image 451 and the second decoded image 452. Moreover, as shown in FIG. 8, when ID1 and ID3 are indicated by the view identifier 463, the display device 422A displays the first decoded image 451 and the third decoded image 453. For example, as shown in FIG. 9, when ID2 and ID3 are indicated by the view identifier 463, the display device 422A displays the second decoded image 452 and the third decoded image 453.

As described above, by using the view identifier as the view identification information, the image decoding apparatus 400A can easily select an image to be displayed.

It should be noted that the view identification information may indicate a view of the synthetic image generated by synthesizing the images from two of the capturing views. In this case, the display device 422A generates a synthetic image of view indicated by the view identification information by synthesizing the decoded images corresponding to two of the capturing views, and displays the generated synthetic image.

For example, the view identification information includes one or more view identifiers for identifying a view position of the synthetic image, and information indicating a distance from the one or more view identifiers to the view position of the synthetic image. It should be noted that when the stereo image is displayed, one view identifier and the above described distance are defined for one display view.

Moreover, the distance may be indicated with a fraction (for example, a) which indicating at which point between the first view and the second view the view of the synthetic image is located. In this case, the above described distance is expressed by "a×the real distance between the first view and the second view".

It should be noted that although the above description describes an example of the case where an image of three views is generated in the image encoding apparatus 300A and an image of two views is generated in the image decoding apparatus 400A, an image of four or more views may be generated in the image encoding apparatus 300A and an image of three or more views may be displayed in the image decoding apparatus 400A.

The following will describe another example of the view identification information.

Figure 10:
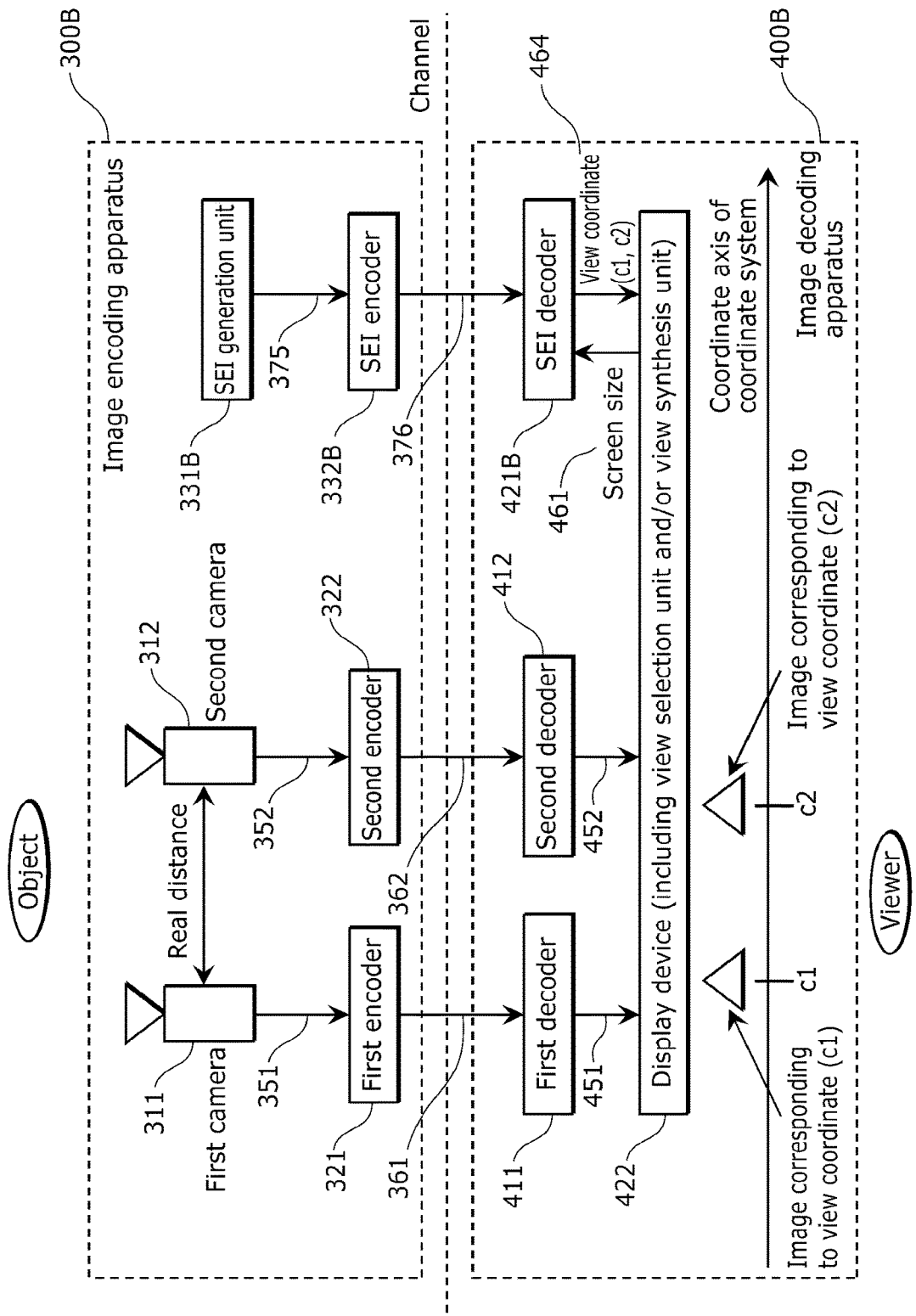
FIG. 10 is a block diagram of an image encoding apparatus and an image decoding apparatus according to another example of Embodiment 1.

FIG. 10 is a block diagram showing a configuration of an image encoding apparatus 300B and an image decoding apparatus 400B when view coordinates are used as the view identification information. It should be noted that the elements which are the same as those in FIG. 5 are provided with the same reference signs, and the different points will be mainly described later.

The image encoding apparatus 300B shown in FIG. 10 has an SEI generation unit 331B and an SEI encoder 332B having different functions from those of the SEI generation unit 331 and the SEI encoder 332 in the configuration of the image encoding apparatus 300.

The SEI generation unit 331B is a view identification information generation unit which generates a view coordinate 375 corresponding to each of the screen sizes. In other words, the SEI generation unit 331B generates a plurality of the view coordinates 375 corresponding to the screen sizes on a one-to-one basis. Each of the view coordinates 375 shows the coordinates of the display views. In other words, the view coordinate 375 indicates the coordinate of a coordinate system in the display device 422B. Moreover, the view coordinate 375 shows coordinates which correspond to the two views (display views) which can provide a viewer with the optimal depth impression when displaying a multi-view image (stereoscopic image) on the display of the corresponding screen size.

The SEI encoder 332B is a view identification information encoder which generates the encoded view coordinate 376 by encoding the view coordinates 375.

As described above, the image encoding apparatus 300B generates an encoded bitstream which includes the first encoded image 361, the second encoded image 362, and the encoded view coordinate 376. Then, the encoded bitstream is transmitted via a channel to the image decoding apparatus 400B.

The image decoding apparatus 400B decodes the encoded bitstream generated by the image encoding apparatus 300B, and displays a multi-view image. Moreover, the image decoding apparatus 400B has an SEI decoder 421B and the display device 422B having different functions from those of the SEI decoder 421 and the display device 422 in the configuration of the image decoding apparatus 400.

The SEI decoder 421B is a view identification information decoder which generates the view coordinates 464 by decoding the encoded view coordinates 376.

The display device 422B (display) displays a multi-view image (stereoscopic image) using the first decoded image 451 and the second decoded image 452. Specifically, the display device 422B obtains the view coordinates 464 corresponding to its own screen size 461, among the view coordinates 464. Then, the display device 422B determines, according to the obtained view coordinates 464, display views that are a plurality of views to be used for display, and displays the images from the determined display views as a multi-view image. The determination of the display view is performed by a view determination unit included in the display device 422B.

For example, the display device 422B generates a synthetic image corresponding to a view between the first view and the second view by synthesizing views using the first decoded image 451 and the second decoded image 452. Here, the view positions of the two synthetic images generated by view synthesis correspond to the obtained two view coordinates 464. For example, the view positions of the two synthetic images are located at two view coordinates 464.

Then, the display device 422B displays the generated two synthetic images as a multi-view image. It should be noted that at least one of the two view positions 462 may be equal to a view position of the first camera or the second camera. In this case, view synthesis is not performed, and the first decoded image 451 or the second decoded image 452 is used for display.

The following will describe a syntax structure of SEI message including the above described view identification information.

FIG. 11 is a diagram showing a syntax example of SEI "3d_reference_displays_info".

The syntax element preferred_left_view_id_flag indicates whether or not the view identification information of a view (preferred_left_view_id) that the image decoding apparatus uses for display to the left eye is included in a bitstream.

The syntax element preferred_left_view_id is the view identification information of a view that the image decoding apparatus uses for display to the left eye, and corresponds to the above described identifier, for example.

The syntax element preferred_right_view_id_flag indicates whether or not the view identification information of a view (preferred_right_view_id) that the image decoding apparatus uses for display to the right eye is included in a bitstream.

The syntax element preferred_right_view_id is the view identification information of a view that the image decoding apparatus uses for display to the right eye, and corresponds to the above described identifier, for example.

When the view identification information for the left eye and the right eye is already encoded, the optimal inter-camera distance does not have to be included in a bitstream.

When one of the view identification information for the right eye and the view identification information for the left eye is already encoded, the image decoding apparatus determines the first view to be used for display to one of the eyes, using the one of the view identification information items. Furthermore, in this case, the optimal inter-camera distance (exponent_ref_baseline, and mantissa_ref_baseline) is encoded in a bitstream. Then, the image decoding apparatus identifies, using the inter-camera distance, the position of the second view corresponding to the first view (including the synthetic view).

Specifically, when the identifier of the left view is encoded along with the optimal inter-camera distance, the position of the second (right) view is determined on the right side of the position of the left view. When the identifier of the right view is encoded along with the optimal inter-camera distance, the position of the second (left) view is determined on the left side of the position of the right view.

When the view identification information item for the left view and the view identification information item for the right view are not encoded, only the optimal inter-camera distance is encoded. It should be noted that the operations of the image encoding apparatus and the image decoding apparatus are the same as those of the above described reference example.

Although the image encoding apparatus and the image decoding apparatus according to the present embodiment have been described, the present disclosure is not limited to the present embodiment.

For example, the view identification information may be an operating point ID which indicates an operating point that is encoded in video usability information (VUI) of a sequence parameter set (SPS).

Moreover, each of the processing units included in the image encoding apparatus and the image decoding apparatus according to the present embodiment is typically implemented as LSI that is an integrated circuit. These may be made into one chip, and a part or all of these may be made into one chip.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

In the above embodiments, each of the constituent elements may be configured by dedicated hardware, and may be realized by executing a software program suitable for each of the constituent elements. Each of the constituent elements may be realized by reading and executing a software program which records a program execution unit such as CPU or a processor on a recording medium such as hard disk or a semiconductor memory.

In other words, the image encoding apparatus and the image decoding apparatus include a processing circuitry and a storage which is electrically connected to the processing circuitry (is accessible from the processing circuitry). The processing circuitry includes at least one of dedicated hardware and the program execution unit. Moreover, the storage stores a software program executed by the program execution unit when the processing circuitry includes the program execution unit. The processing circuitry performs, using the storage, the image encoding method or the image decoding method according to the above embodiments.

Furthermore, the present disclosure may be the software program, and a non-transitory computer-readable recording medium having a program recorded thereon. Moreover, it goes without saying that the program can distributed via a transmission medium such as the Internet.

Moreover, the figures used above are mere example for explaining the present disclosure in detail, and the present disclosure is not limited by the exemplified figures.

Moreover, the division of functional block in a block diagram is mere example. The functional blocks may be realized as a functional block, a functional block may be divided into a plurality of functional blocks, and part of the function may be shifted to another functional block. Moreover, the functions of functional blocks having similar functions may be processed in series and a time-division manner by a piece of hardware or a piece of software.

Moreover, a sequence of steps included in the image encoding method or the image decoding method is mere example for explaining the present disclosure in detail. This means that other sequences other than the above described sequence are acceptable. Moreover, part of the above steps may be simultaneously performed (in parallel) along with other steps.

Although the image encoding method and the image decoding method according to one or more embodiments of the present disclosure have been described, the present disclosure is not limited to the embodiments. Although only some exemplary embodiments have been described in detail above, those skilled in the art will readily appreciate that various modifications may be made in these exemplary embodiments without materially departing from the principles and spirit of the inventive concept, the scope of which is defined in one or more aspects of the present disclosure.

Embodiment 2

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 12:
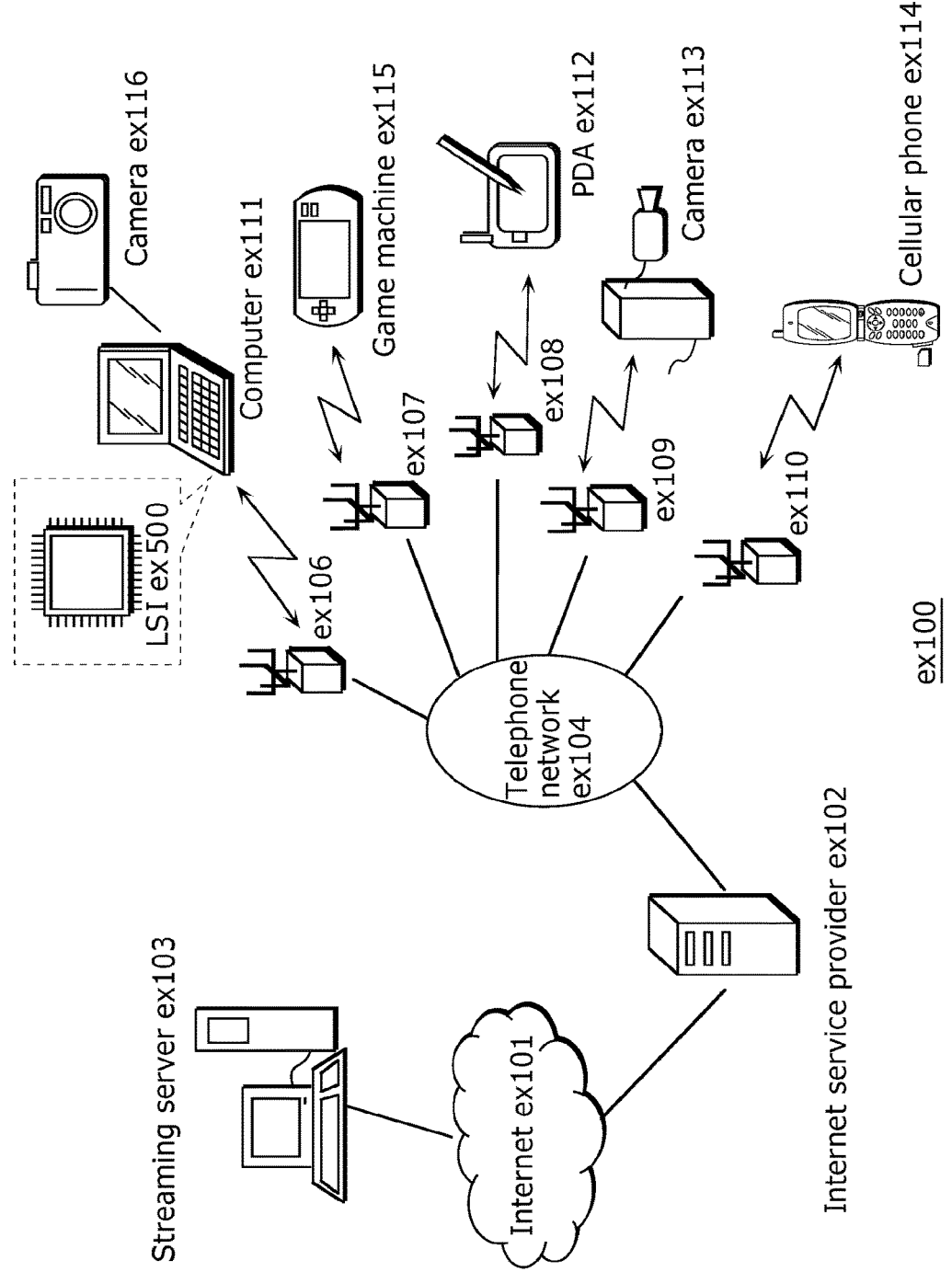
FIG. 12 shows an overall configuration of a content providing system for implementing content distribution services.

FIG. 12 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 12, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 13:
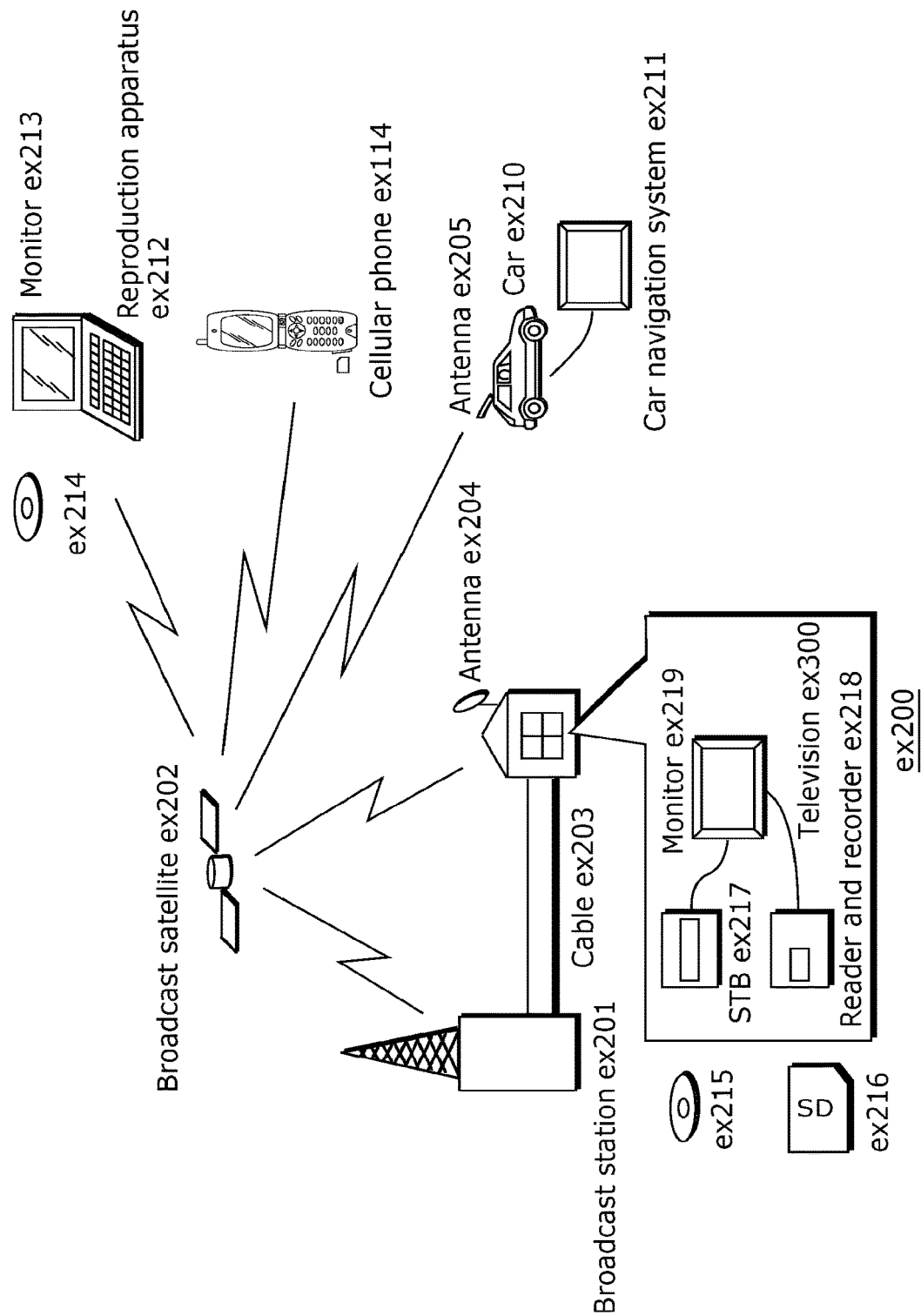
FIG. 13 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 13. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 14:
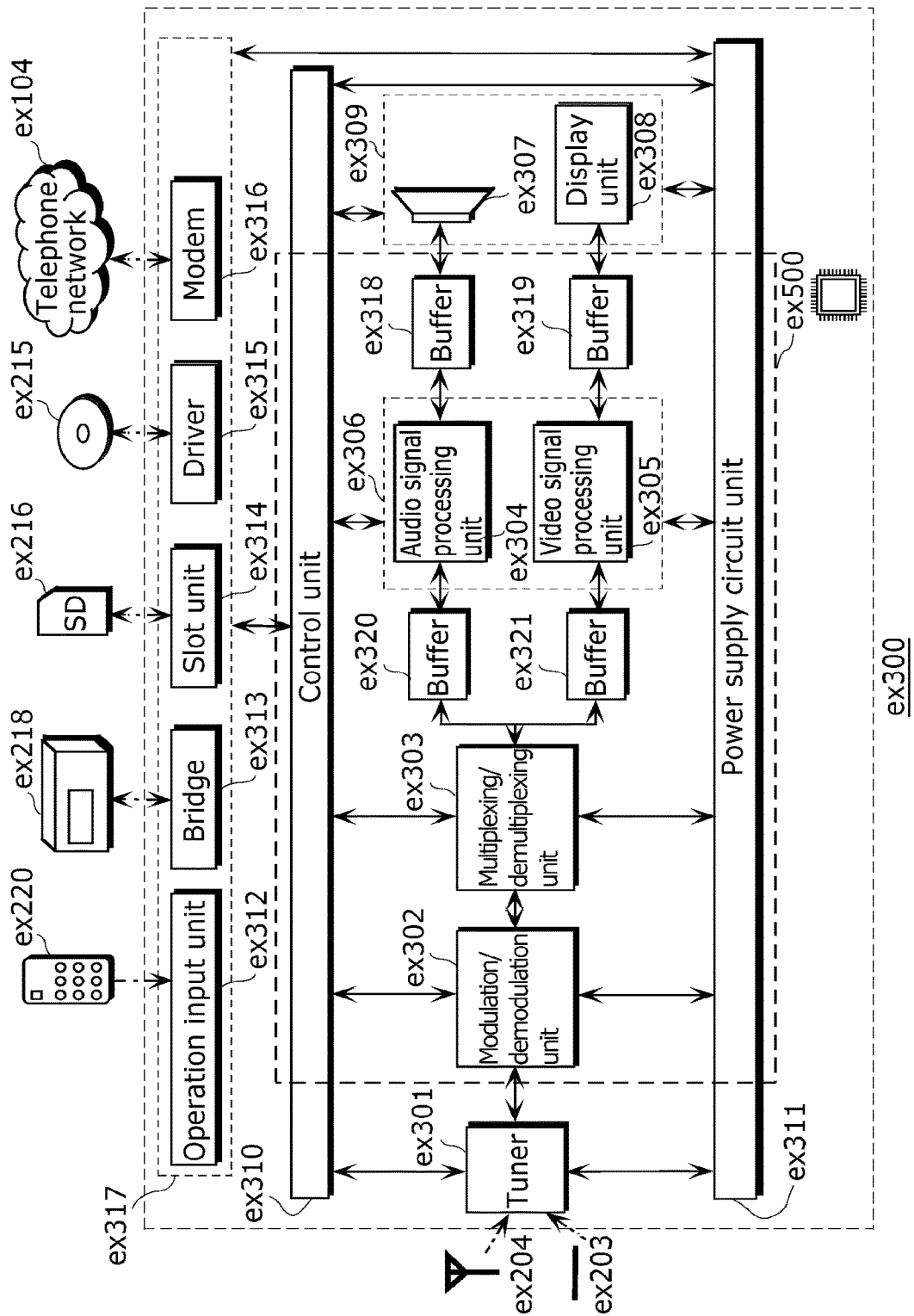
FIG. 14 shows a block diagram illustrating an example of a configuration of a television.

FIG. 14 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a nonvolatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 15:
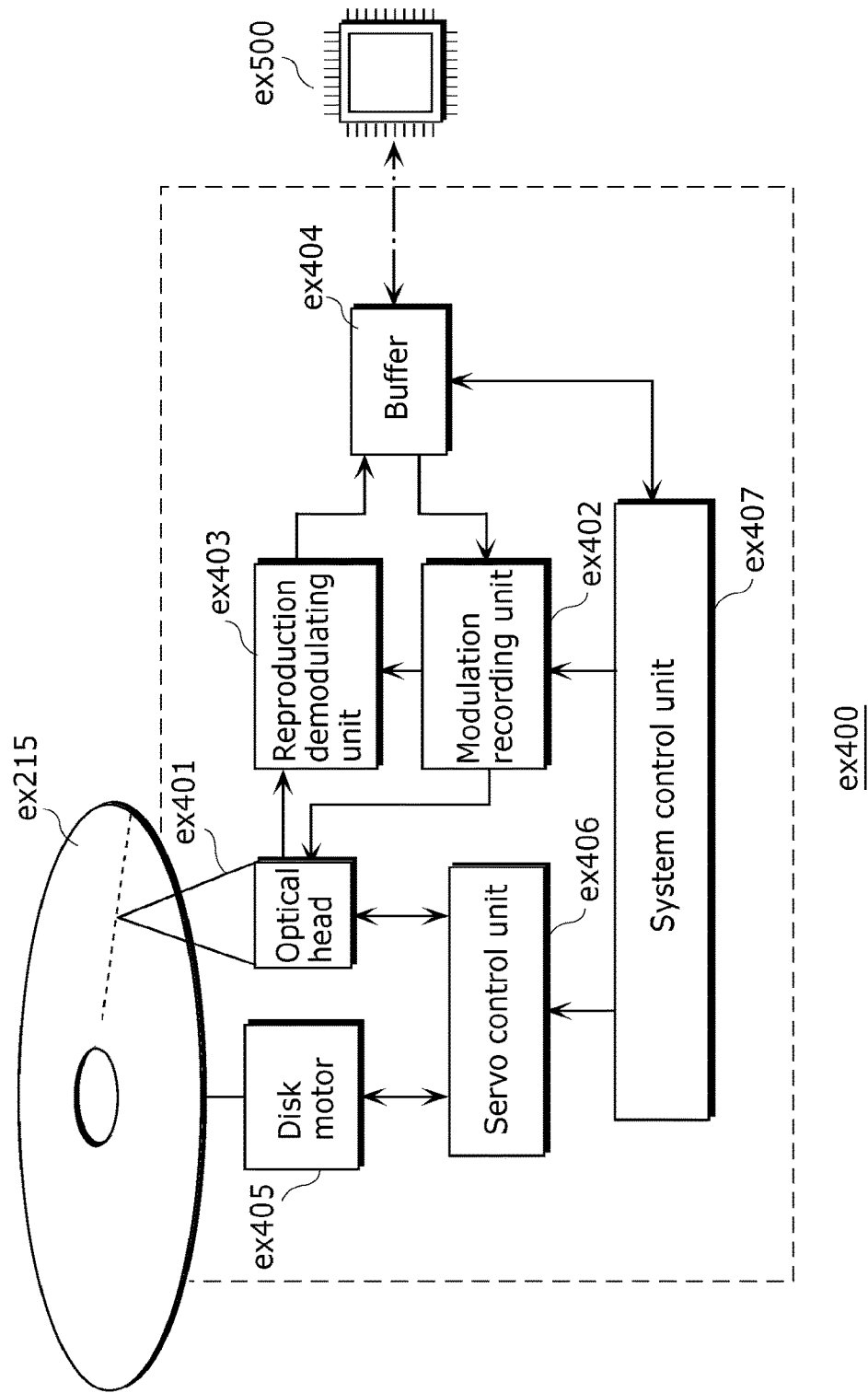
FIG. 15 shows a block diagram illustrating an example of a configuration of an information reproducing/recording unit that reads and writes information from and on a recording medium that is an optical disk.

As an example, FIG. 15 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 16:
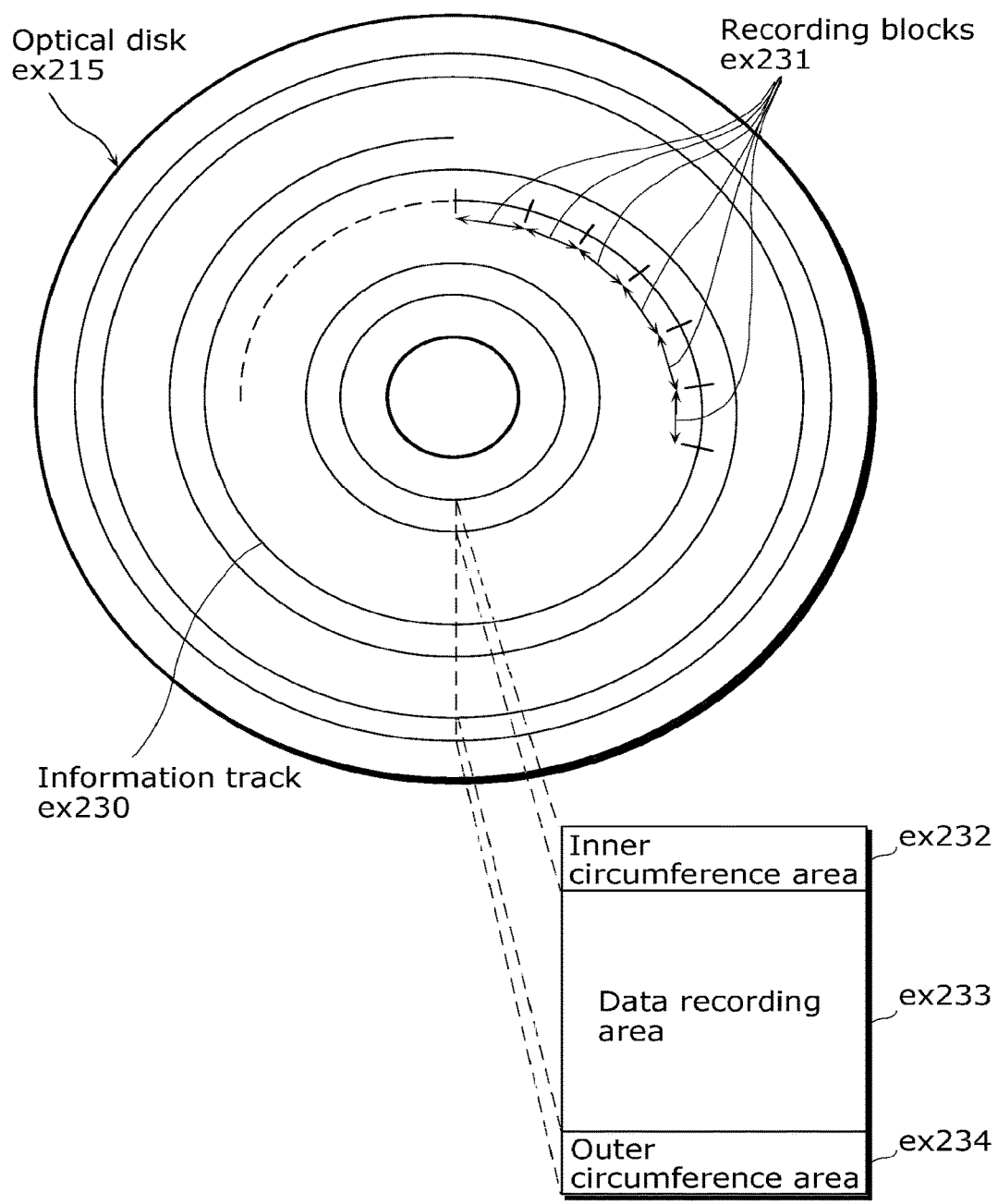
FIG. 16 shows an example of a configuration of a recording medium that is an optical disk.

FIG. 16 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 112. The same will be true for the configuration of the computer ex111, the cellular phone ex114, and others.

Figure 17A:
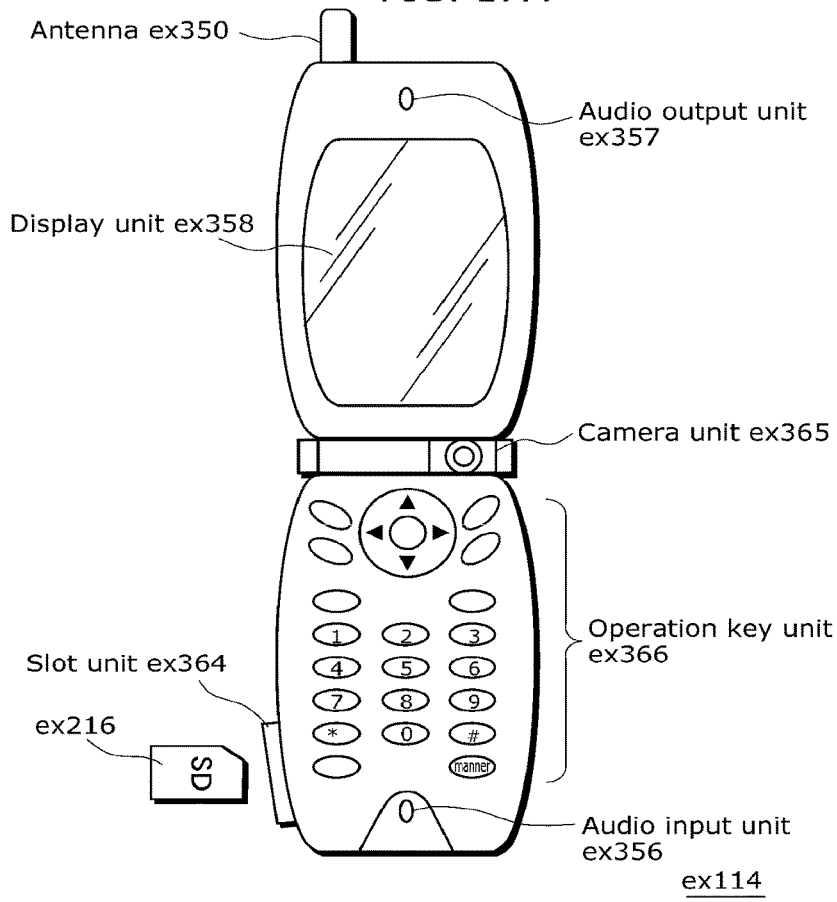
FIG. 17A shows an example of a cellular phone.

FIG. 17A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 17B:
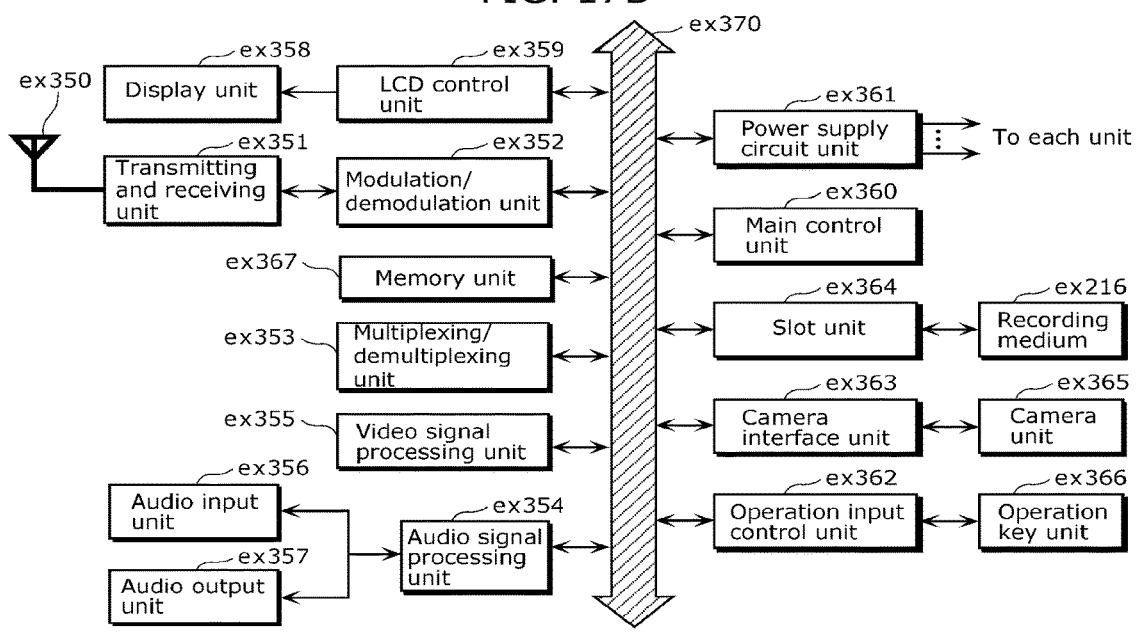
FIG. 17B is a block diagram showing an example of a configuration of a cellular phone.

Next, an example of a configuration of the cellular phone ex114 will be described with reference to FIG. 17B. In the cellular phone ex114, a main control unit ex366 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 3

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

Figure 18:
FIG. 18 illustrates a structure of multiplexed data.

FIG. 18 illustrates a structure of the multiplexed data. As illustrated in FIG. 18, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 19:
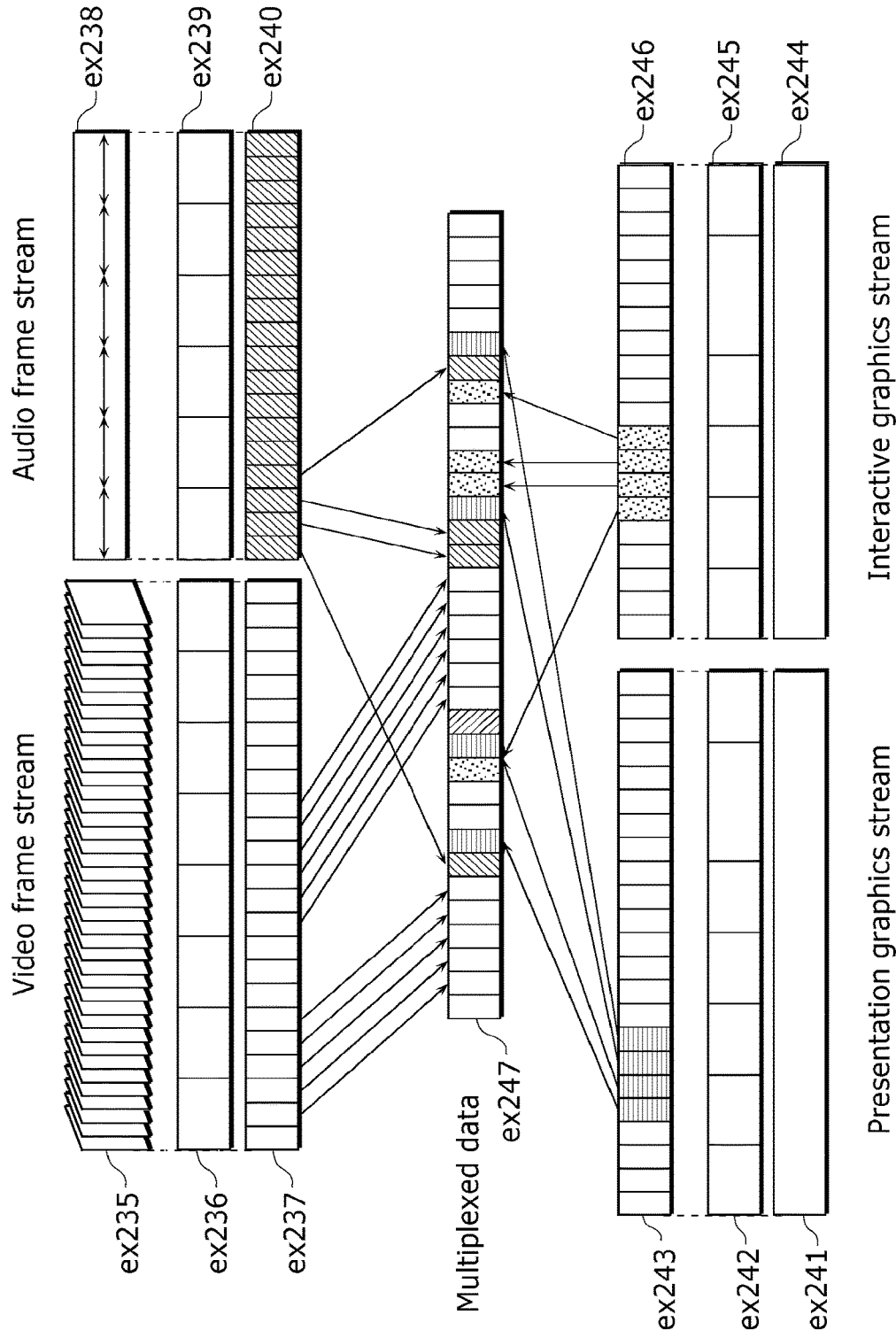
FIG. 19 schematically shows how each stream is multiplexed in multiplexed data.

FIG. 19 schematically illustrates how data is multiplexed. First, a video stream ex235 composed of video frames and an audio stream ex238 composed of audio frames are transformed into a stream of PES packets ex235 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 20:
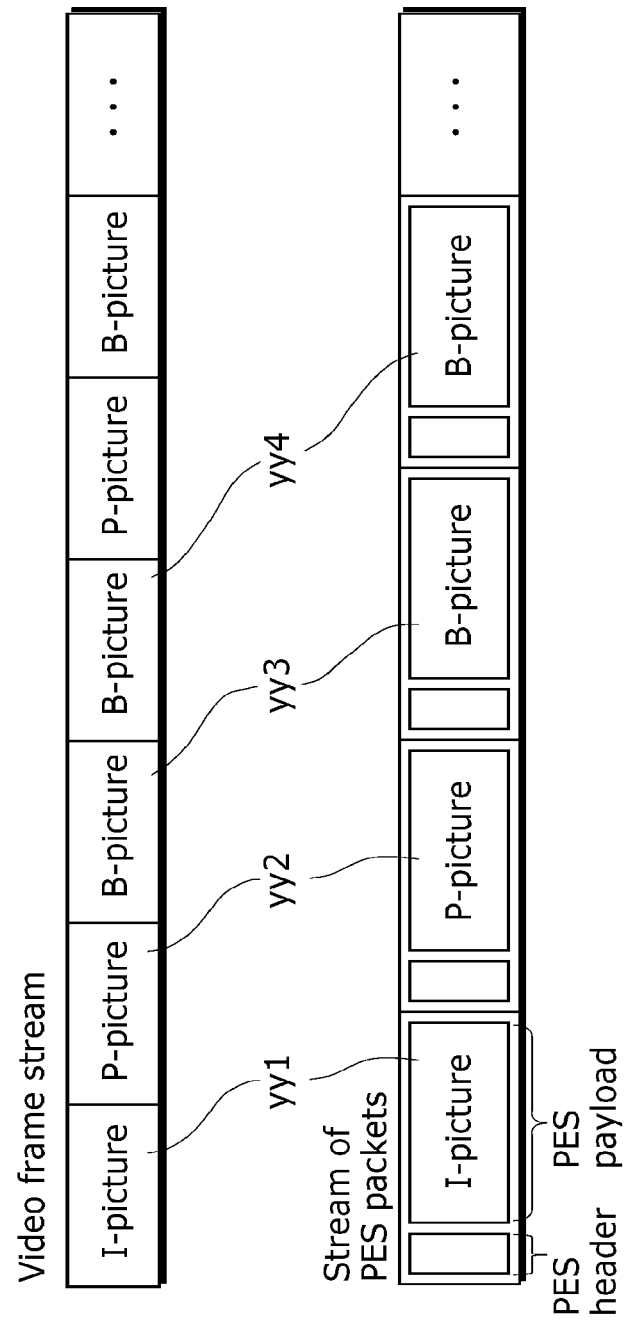
FIG. 20 shows how a video stream is stored in a stream of PES packets in more detail.

FIG. 20 illustrates how a video stream is stored in a stream of PES packets in more detail. The first bar in FIG. 20 shows a video frame stream in a video stream. The second bar shows the stream of PES packets. As indicated by arrows denoted as yy1, yy2, yy3, and yy4 in FIG. 118, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 21:
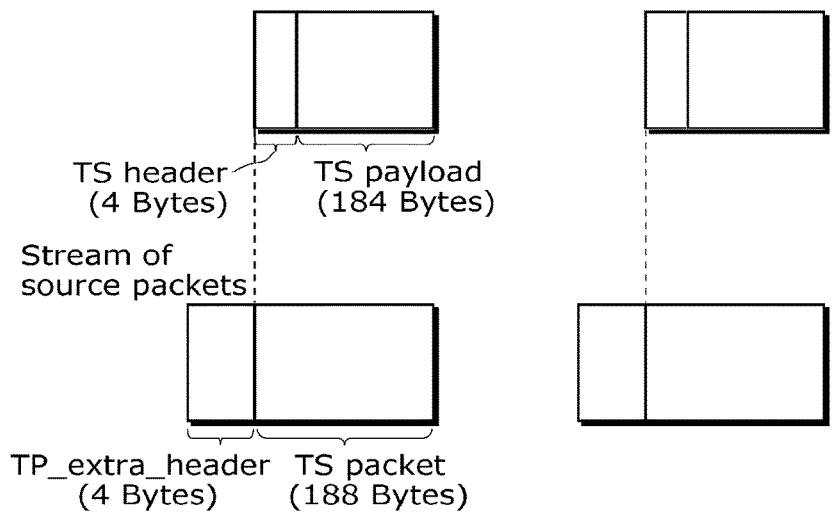
FIG. 21 shows a structure of TS packets and source packets in the multiplexed data.

FIG. 21 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 21. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 22:
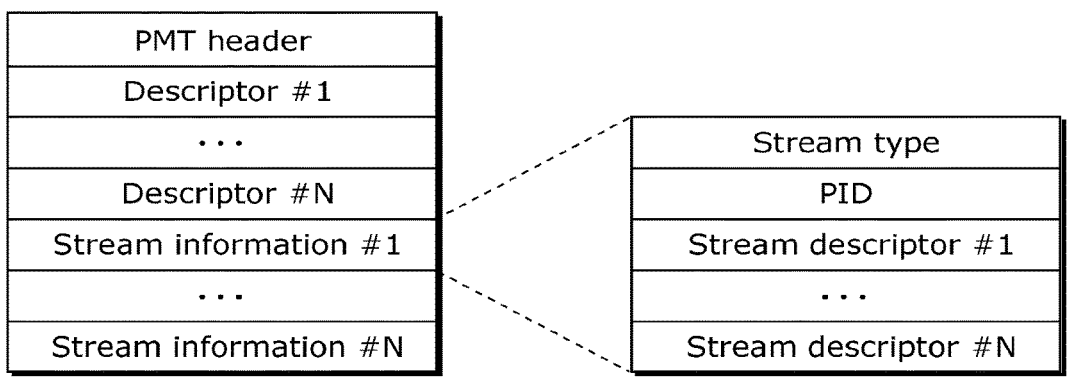
FIG. 22 shows a data structure of a PMT.

FIG. 22 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 23:
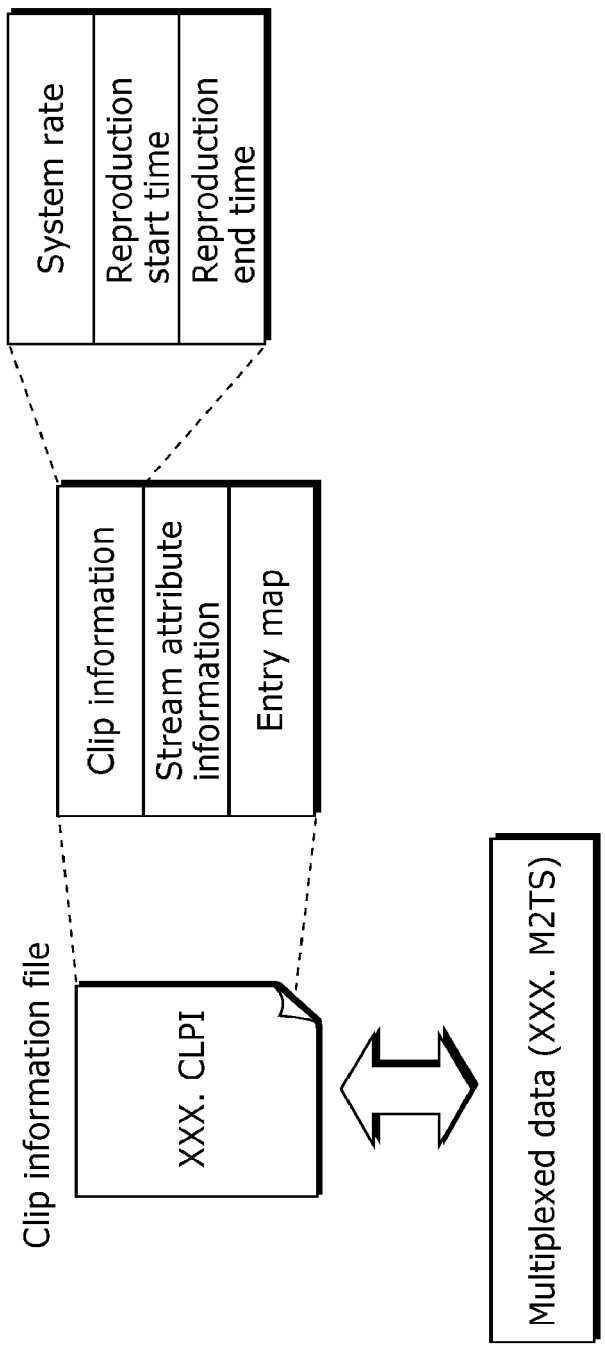
FIG. 23 shows an internal structure of multiplexed data information.

Each of the multiplexed data information files is management information of the multiplexed data as shown in FIG. 23. The multiplexed data information files are in one to one correspondence with the multiplexed data, and each of the files includes multiplexed data information, stream attribute information, and an entry map.

As illustrated in FIG. 23, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 24:
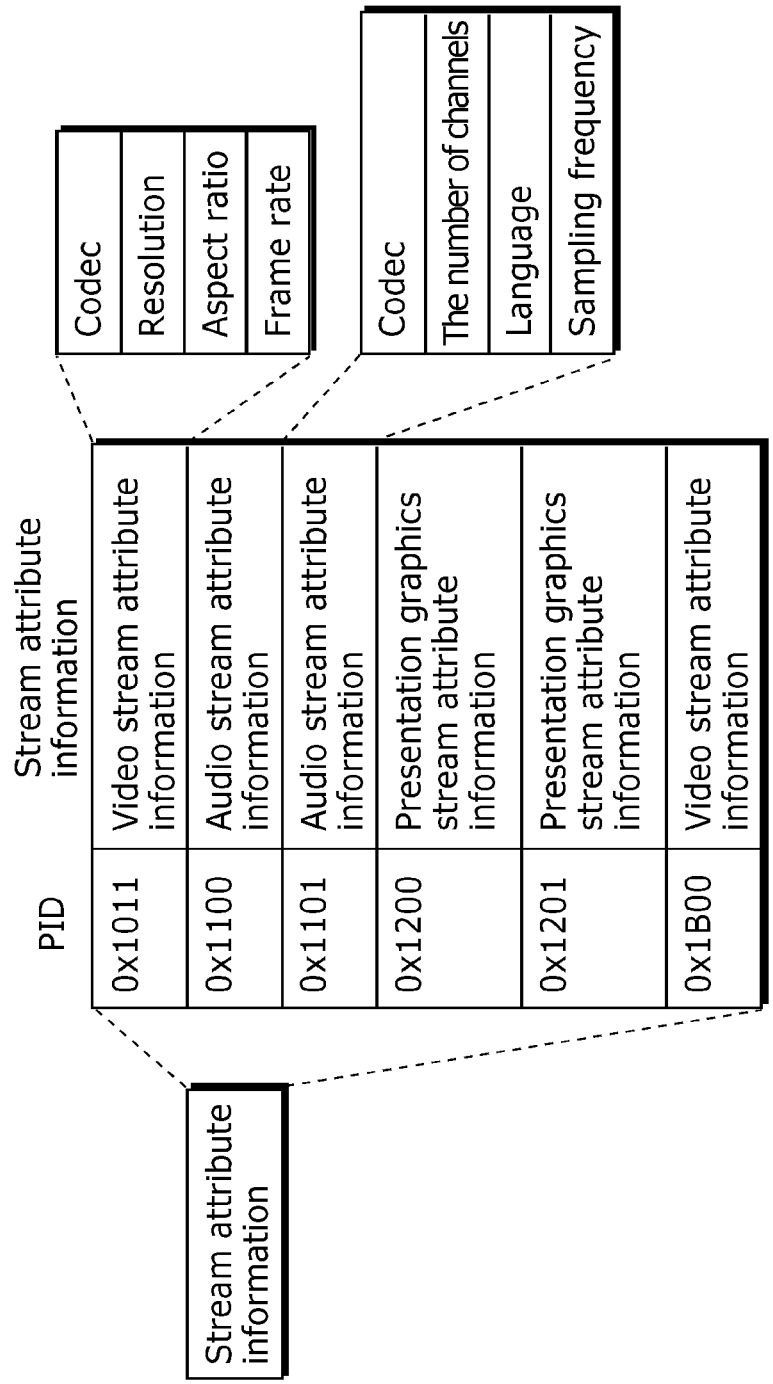
FIG. 24 shows an internal structure of stream attribute information.

As shown in FIG. 24, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 25:
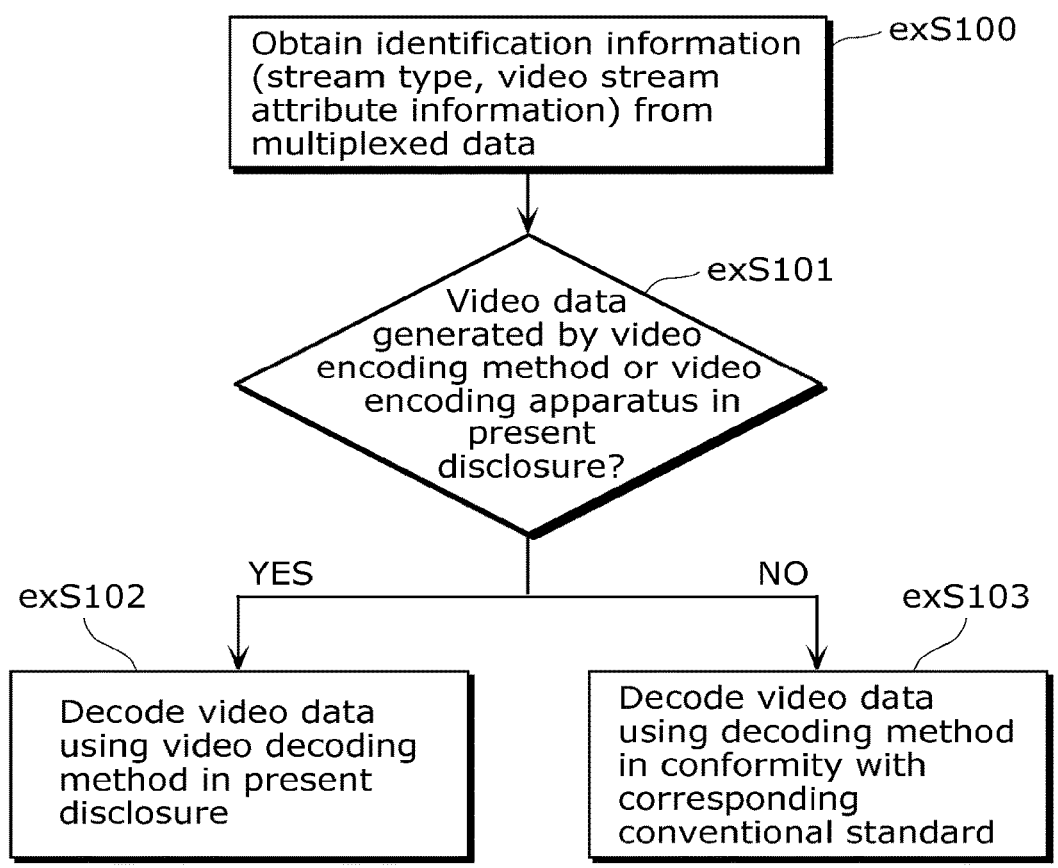
FIG. 25 shows steps for identifying video data.

Furthermore, FIG. 25 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 4

Figure 26:
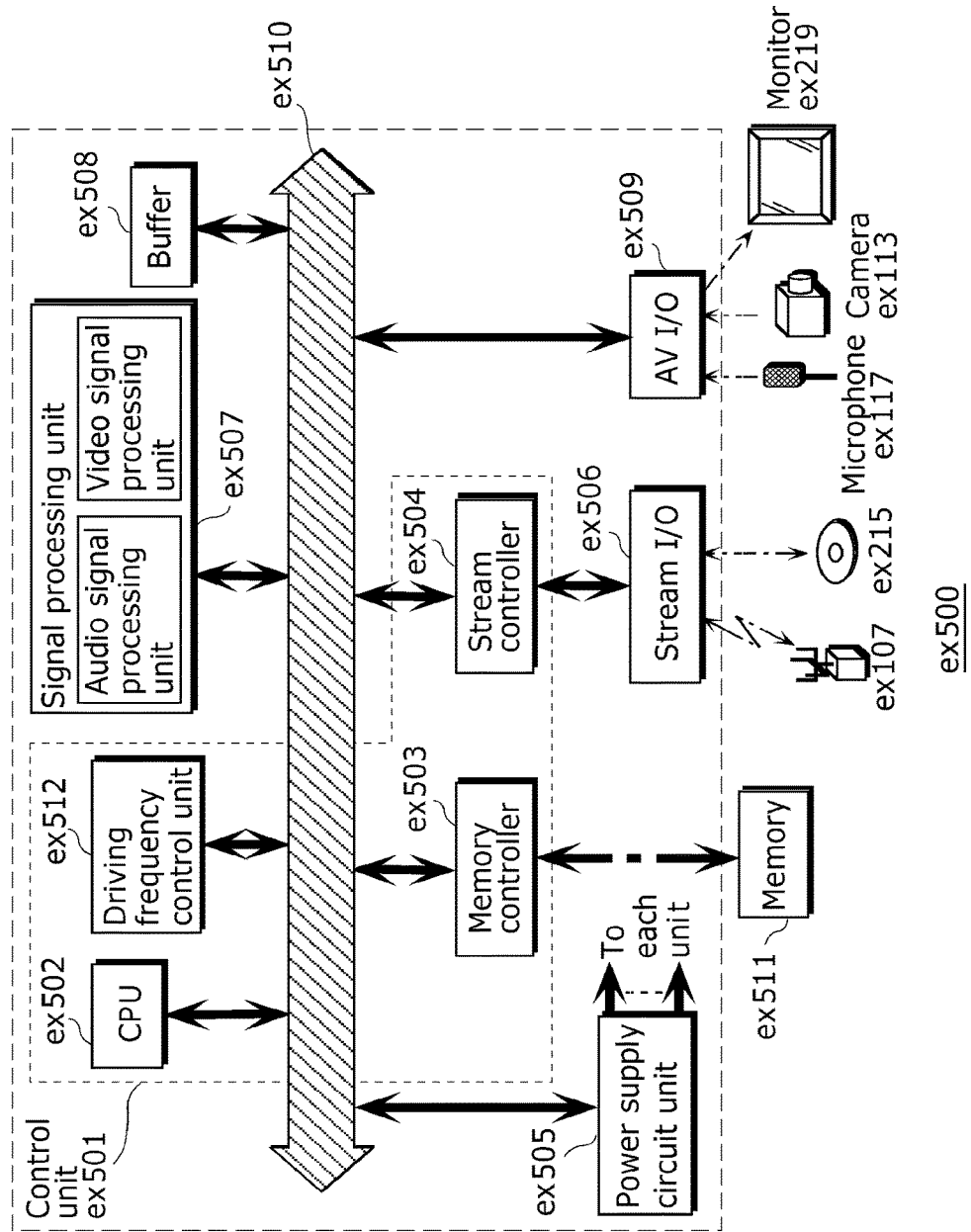
FIG. 26 shows an example of a configuration of an integrated circuit for implementing the moving picture coding method and the moving picture decoding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 26 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 5

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. There is a problem that the power consumption increases.

Figure 27:
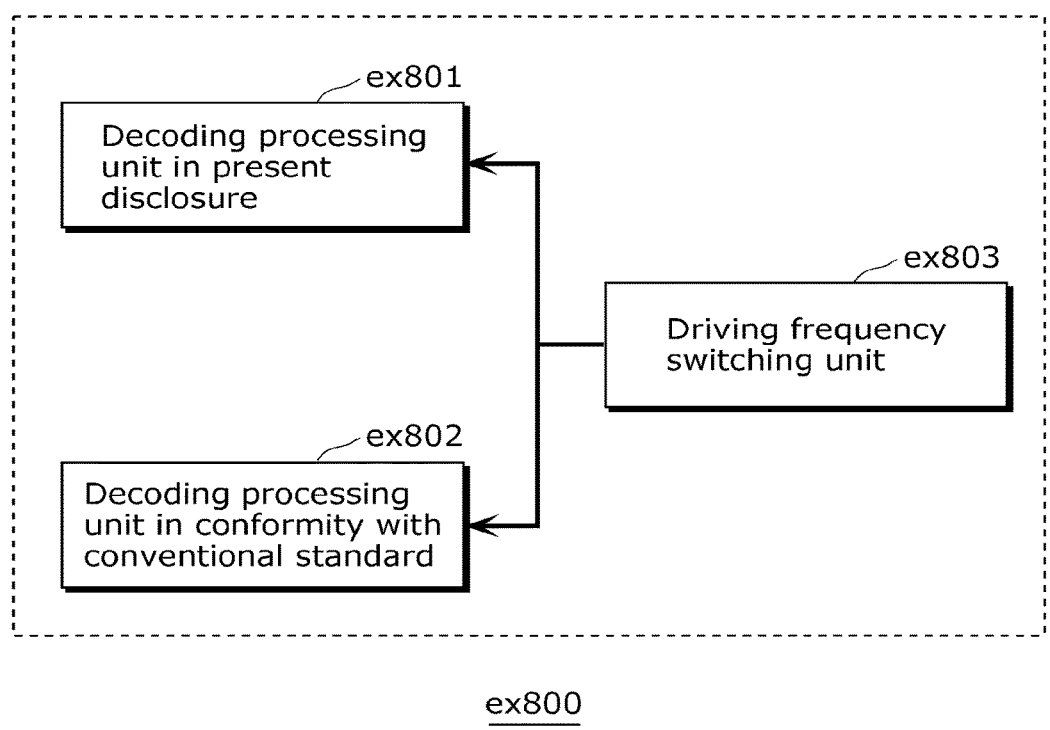
FIG. 27 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 27 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 26. Here, each of the decoding processing unit ex801 that executes the moving picture decoding method described in each of embodiments and the decoding processing unit ex802 that conforms to the conventional standard corresponds to the signal processing unit ex507 in FIG. 26. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 127. The driving frequency can be selected by storing the look-up table in the buffer ex508 and in an internal memory of an LSI, and with reference to the look-up table by the CPU ex502.

Figure 28:
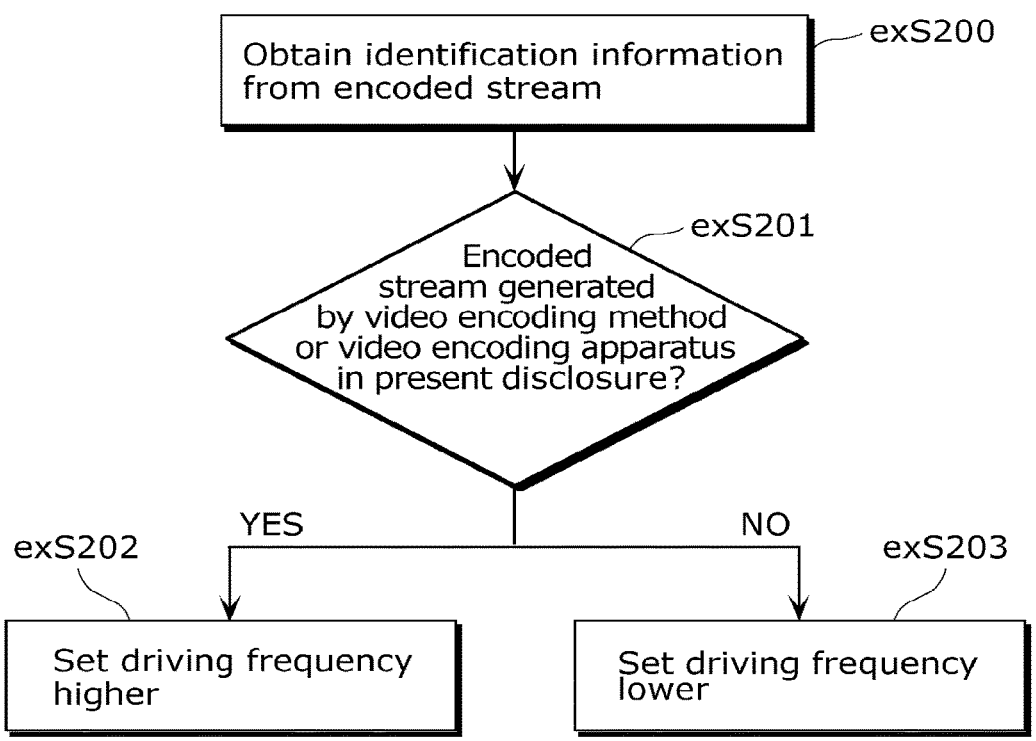
FIG. 28 shows steps for identifying video data and switching between driving frequencies.

FIG. 28 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 30A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensation. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by the control of a multi-view image in particular, for example, the dedicated decoding processing unit ex901 is used for the control of a multi-view image. Otherwise, the decoding processing unit is probably shared for one of the inverse quantization, entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 30B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

The herein disclosed subject matter is to be considered descriptive and illustrative only, and the appended claims are of a scope intended to cover and encompass not only the particular embodiments disclosed, but also equivalent structures, methods, and/or uses.

INDUSTRIAL APPLICABILITY

An image encoding method, an image decoding method, an image encoding apparatus, and an image decoding apparatus according to one or more exemplary embodiments disclosed herein are applicable to an information display device or an imaging device having high resolution such as a television, a digital video recorder, a car navigation system, a mobile phone, a digital camera, and a digital video camera that include an image encoding apparatus.

The invention claimed is:
1. An image encoding method for encoding a multi-view image including a plurality of views, the image encoding method comprising:
   generating a plurality of pairs of view identification information items corresponding to a plurality of screen sizes used in an image decoding apparatus on a one-to-one basis, wherein each of the pairs of view identification information items is respectively associated with a different one of the screen sizes; and
   encoding the pairs of view identification information items,
   wherein each of the pairs of view identification information items includes (i) view identification information for display to a left eye and (ii) view identification information for display to a right eye,
   wherein for each of the pairs of view identification information items, (i) the view identification information for display to the left eye indicates a first view and a second view from among the plurality of views and (ii) the view identification information for display to the right eye indicates a third view and a fourth view from among the plurality of views,
   wherein for each of the pairs of view identification information items, (i) the view identification information of the view for display to the left eye indicates a first distance from the first view or the second view to a view of a first synthetic image and (ii) the view identification information of the view for display to the right eye indicates a second distance from the third view or the fourth view to a view of a second synthetic image, and wherein the image decoding apparatus:
  generates the first synthetic image by synthesizing, using the view identification information of the view for display to the left eye, an image of the first view and an image of the second view;
  generates the second synthetic image by synthesizing, using the view identification information of the view for display to the right eye, an image of the third view and an image of the fourth view;
  displays the first synthetic image for the left eye; and
  displays the second synthetic image for the right eye.

2. An image decoding method for decoding a bitstream generated by encoding a multi-view image including a plurality of views, the image decoding method comprising:
  decoding a plurality of pairs of view identification information items corresponding to a plurality of screen sizes used in an image decoding apparatus on a one-to-one basis, wherein each of the pairs of view identification information items is respectively associated with a different one of the screen sizes; and
  determining display views to be used for display in the image decoding apparatus using one of the decoded pairs of view identification information items corresponding to a screen size of a display device included in the image decoding apparatus,
  wherein each of the pairs of view identification information items includes (i) view identification information for display to a left eye and (ii) view identification information for display to a right eye,
  wherein for each of the pairs of view identification information items, (i) the view identification information for display to the left eye indicates a first view and a second view from among the plurality of views and (ii) the view identification information for display to the right eye indicates a third view and a fourth view from among the plurality of views,
  wherein for each of the pairs of view identification information items, (i) the view identification information of the view for display to the left eye indicates a first distance from the first view or the second view to a view of a first synthetic image and (ii) the view identification information of the view for display to the right eye indicates a second distance from the third view or the fourth view to a view of a second synthetic image, and
  wherein image decoding method further comprises:
    generating the first synthetic image by synthesizing, using the view identification information of the view for display to the left eye, an image of the first view and an image of the second view;
    generating the second synthetic image by synthesizing, using the view identification information of the view for display to the right eye, an image of the third view and an image of the fourth view;
    displaying the first synthetic image for the left eye; and
    displaying the second synthetic image for the right eye.

3. An image encoding apparatus which encodes a multi-view image including a plurality of views, the image encoding apparatus comprising:
  a view identification information generation unit configured to generate a plurality of pairs of view identification information items corresponding to a plurality of screen sizes used in an image decoding apparatus on a one-to-one basis, wherein each of the pairs of view identification information items is respectively associated with one of the screen sizes,
  a view identification information encoder which encodes the pairs of view identification information items,
  wherein each of the pairs of view identification information items includes (i) view identification information for display to a left eye and (ii) view identification information for display to a right eye,
  wherein for each of the pairs of view identification information items, (i) the view identification information for display to the left eye indicates a first view and a second view from among the plurality of views and (ii) the view identification information for display to the right eye indicates a third view and a fourth view from among the plurality of views,
  wherein for each of the pairs of view identification information items, (i) the view identification information of the view for display to the left eye indicates a first distance from the first view or the second view to a view of a first synthetic image and (ii) the view identification information of the view for display to the right eye indicates a second distance from the third view or the fourth view to a view of a second synthetic image, and
  wherein the image decoding apparatus:
    generates the first synthetic image by synthesizing, using the view identification information of the view for display to the left eye, an image of the first view and an image of the second view;
    generates the second synthetic image by synthesizing, using the view identification information of the view for display to the right eye, an image of the third view and an image of the fourth view;
    displays the first synthetic image for the left eye; and
    displays the second synthetic image for the right eye.

4. An image decoding apparatus which decodes a bitstream generated by encoding a multi-view image including a plurality of views, the image decoding apparatus comprising:
  a view identification information decoder which decodes a plurality of pairs of view identification information items corresponding to a plurality of screen sizes used in the image decoding apparatus on a one-to-one basis, wherein each of the pairs of view identification information items is respectively associated with a different one of the screen sizes; and
  a view determination unit configured to determine a display view to be used for display in the image decoding apparatus using one of the decoded pairs of view identification information items corresponding to a screen size of a display device included in the image decoding apparatus,
  wherein each of the pairs of view identification information items includes (i) view identification information for display to a left eye and (ii) view identification information for display to a right eye,
  wherein for each of the pairs of view identification information items, (i) the view identification information for display to the left eye indicates a first view and a second view from among the plurality of views and (ii) the view identification information for display to the right eye indicates a third view and a fourth view from among the plurality of views,
  wherein for each of the pairs of view identification information items, (i) the view identification information of the view for display to the left eye indicates a first distance from the first view and or second view to a view of a first synthetic image and (ii) the view identification information of the view for display to the right eye indicates a second distance from the third view or the fourth view to a view of a second synthetic image, and wherein the image decoding apparatus further comprises a display device configured to:
  generate the first synthetic image by synthesizing, using the view identification information of the view for display to the left eye, an image of the first view and an image of the second view;
  generate the second synthetic image by synthesizing, using the view identification information of the view for display to the right eye, an image of the third view and an image of the fourth view;
  display the first synthetic image for the left eye; and
  display the second synthetic image for the right eye.

5. An image encoding apparatus comprising:
a processor; and
a non-transitory memory having stored thereon executable instructions, which when executed, cause the processor to perform the image encoding method according to claim 1.

6. An image decoding apparatus comprising:
a processor; and
a non-transitory memory having stored thereon executable instructions, which when executed, cause the processor to perform the image decoding method according to claim 2.

7. The image encoding method according to claim 1,
wherein in the encoding, information indicating an optimal inter-camera distance is further encoded.

\* \* \* \* \*